US008619318B2

(12) United States Patent
Motoyama

(10) Patent No.: US 8,619,318 B2
(45) Date of Patent: Dec. 31, 2013

(54) IMAGE FORMING APPARATUS WITH IMAGE SCALING RATIO SETTING FEATURE

(75) Inventor: Hajime Motoyama, Moriya (JP)

(73) Assignee: Canon Kabushiki Kaisha (JP)

( * ) Notice: Subject to any disclaimer, the term of this patent is extended or adjusted under 35 U.S.C. 154(b) by 1545 days.

(21) Appl. No.: 12/168,386

(22) Filed: Jul. 7, 2008

(65) Prior Publication Data

US 2009/0009823 A1 Jan. 8, 2009

(30) Foreign Application Priority Data

Jul. 6, 2007 (JP) ................................ 2007-178807
Jun. 24, 2008 (JP) ................................ 2008-165091

(51) Int. Cl.
*G06K 15/02* (2006.01)

(52) U.S. Cl.
USPC ............ 358/1.2; 358/448; 358/1.9; 358/474; 382/296; 347/116; 347/119; 345/428; 250/205

(58) Field of Classification Search
USPC ................... 358/448, 1.9, 474, 1.2; 382/296; 347/116, 119; 345/428; 250/205
See application file for complete search history.

(56) References Cited

U.S. PATENT DOCUMENTS 5,594,555 A * 1/1997 Ishida .......................... 358/448
6,101,018 A * 8/2000 Naiki et al. ................ 359/204.1
6,236,415 B1 5/2001 Nozaki et al.
6,633,415 B1 * 10/2003 Arafune et al. ............... 358/474
2001/0055120 A1 12/2001 Sawada et al.
2002/0063710 A1 * 5/2002 Hirota et al. .................. 345/428
2004/0100548 A1 * 5/2004 Seki .............................. 347/119

FOREIGN PATENT DOCUMENTS

JP 11-006971 A 1/1999
JP 2004-102039 A 4/2004

OTHER PUBLICATIONS

Extended search report issued in corresponding European application No. 08159193.5-2209, dated Nov. 18, 2008.
Japanese Office Action for corresponding JP 2008-165091, mail date Nov. 26, 2012.

* cited by examiner

*Primary Examiner* — Qian Yang
*Assistant Examiner* — Martin Mushambo
(74) *Attorney, Agent, or Firm* — Rossi, Kimms & McDowell LLP

(57) ABSTRACT

A present invention is provided with a laser light source having a plurality of laser elements capable of scanning a plurality of lines in parallel in a sub-scanning direction at a second resolution, which is higher than a first resolution of an image to be formed in a main scanning direction, a multiplexer and a laser driver that set a scaling ratio of an image in the sub-scanning direction in response to the first and second resolutions and an image size for image forming, and perform control so as to select and drive any of the plurality of laser elements of the laser light source in response to the scaling ratio that has been set, and an image forming unit that forms on a print medium an image of lines scanned using laser elements driven by the laser driver.

11 Claims, 16 Drawing Sheets

IMAGE FORMING APPARATUS WITH IMAGE SCALING RATIO SETTING FEATURE

BACKGROUND OF THE INVENTION

1. Field of the Invention

The present invention relates to electrophotographic image forming apparatuses in which image forming is carried out by developing, using toner, a latent image that has been formed on a photosensitive member, transferring a toner image to a transfer material (sheet), and performing fixing.

2. Description of the Related Art

FIG. 1 is a diagram illustrating a configuration of a conventional color image forming apparatus.

This color image forming apparatus is provided with two cassette feeding units 1 and 2, and one manual paper feeding unit 3, and sheets S are selectively fed from each of the feeding units 1, 2, and 3. The sheets S are loaded on cassettes 4 and 5 or a tray 6 of the feeding units 1, 2, and 3, and are drawn out in order from the topmost sheet due to rotation of a pickup roller 7. Then, only the topmost sheet of the sheets S that have been drawn out by the pickup roller 7 is separated by a pair of separation rollers, which is constituted by a feed roller 8A and a retardation roller 8B, and sent to registration rollers 12, the rotation of which is being paused. In this case, the sheet S that has been fed from the paper supply cassette 4 or 5, which has long distances to the registration rollers 12, is sent to the registration rollers 12 by being relayed through multiple pairs of conveying rollers 9, 10, and 11. When the leading edge of the sheet S that has been sent to the registration rollers 12 in this manner hits a nip of the registration rollers 12 and forms a predetermined loop shape, movement of that sheet S is temporarily paused. A diagonal traveling condition of the sheet S is corrected by the formation of this loop.

Downstream from the registration rollers 12, a long intermediate transfer belt (endless belt) 13, which is an intermediate transfer member, is arranged in a tensioned state on a drive roller 13*a*, a secondary transfer opposing roller 13*b*, and a tension roller 13*c*, and from a cross-sectional perspective is set in a substantially triangular shape. The intermediate transfer belt 13 rotates in a clockwise direction in the diagram. A plurality of photosensitive drums 14, 15, 16, and 17, on which color toner images of different colors are formed and carried, are arranged in order along the rotational direction of the intermediate transfer belt 13 on an upper surface of the horizontal section of the intermediate transfer belt 13.

It should be noted that in the rotation direction of the intermediate transfer belt 13, the most upstream photosensitive drum 14 carries a magenta color toner image, the next photosensitive drum 15 carries a cyan color toner image, the photosensitive drum 16 carries a yellow color toner image, and the photosensitive drum 17 carries a black color toner image. First, exposure of a laser light LM commences on the most upstream photosensitive drum 14 based on image data of a magenta component to form an electrostatic latent image on the photosensitive drum 14. This electrostatic latent image is made visible by the magenta color toner supplied from a developer 23. Next, exposure of a laser light LC commences on the photosensitive drum 15 based on image data of a cyan component to form an electrostatic latent image on the photosensitive drum 15. This electrostatic latent image is made visible by the cyan color toner supplied from a developer 24. Numeral 22 denotes a scanner unit, which is an exposure means of the photosensitive drums 14 to 17.

Next, after a predetermined time has elapsed from the commencement of exposure of the laser light LC to the photosensitive drum 15, exposure of a laser light LY commences on the photosensitive drum 16 based on image data of a yellow component to form an electrostatic latent image on the photosensitive drum 16. This electrostatic latent image is made visible by the yellow color toner supplied from a developer 25. Next, after a predetermined time has elapsed from the commencement of exposure of the laser light LY to the photosensitive drum 16, exposure of a laser light LB commences on the photosensitive drum 17 based on image data of a black component to form an electrostatic latent image on the photosensitive drum 17. This electrostatic latent image is made visible by the black color toner supplied from a developer 26. It should be noted that primary chargers 27, 28, 29, and 30 for uniformly charging the photosensitive drums 14 to 17 are provided at a circumference of the photosensitive drums 14 to 17. Further still, cleaners 31, 32, 33, and 34 are arranged for removing toner that has adhered on the photosensitive drums 14 to 17 after transfer of the toner images.

In the process of rotating clockwise, the intermediate transfer belt 13 passes successively through transfer portions between the photosensitive drums 14, 15, 16, and 17 and their corresponding transfer chargers 90, 91, 92, and 93. Due to this, the toner images of each of the colors magenta, cyan, yellow, and black are transferred onto the intermediate transfer belt 13 superimposed on each other.

Meanwhile, the registration rollers 12 commence rotating with a timing that matches the positions of the toner image on the intermediate transfer belt 13 and the leading edge of the sheet. Due to this, the sheet S, which has been sent to the registration rollers 12 and had its diagonal traveling condition corrected, is sent to a secondary transfer portion T2, which is a contact portion between a secondary transfer roller 40 on the intermediate transfer belt 13 and the secondary transfer opposing roller 13*b*, and the toner image is transferred onto the sheet S.

In this manner, the sheet S, which has passed through the secondary transfer portion T2, is sent to a fixing unit 35. Then, due to a process of passing through a nip portion formed by a fixing roller 35A and a pressure roller 35B in the fixing unit 35, the sheet S is subjected to heat by the fixing roller 35A and pressure by the pressure roller 35B, and the transferred toner image is fixed onto the sheet.

The sheet S that has passed through the fixing unit 35 and undergone the fixing process is sent by a pair of conveyance rollers 36 to a pair of discharge rollers 37, and moreover is discharged outside the apparatus onto a discharge tray 38.

This image forming apparatus is capable of a double side mode of image forming. Hereinafter, the configuration of the image forming apparatus is further described in accordance with a flow of the sheet S during double side mode.

When double side mode is specified, the sheet S that has passed through the fixing unit 35 and undergone the fixing process is set to an inversion path 59 via a vertical path 58. In this case, as flapper 60 opens the vertical path 58 and the sheet S is conveyed by pairs of conveyance rollers 36, 61, and 62, and a pair of reverse rollers 63.

The pair of reverse rollers 63 rotate in reverse at a time point at which the trailing edge of the sheet S, which is conveyed in the direction of arrow a by the pair of reverse rollers 63, has passed a point P, and the sheet S is conveyed in the direction of arrow b with its trailing edge side now in front. Due to this operation, the surface of the sheet S where the toner image has been transferred becomes the upper side. It should be noted that a flapper 64 is provided for the point P that makes it possible for the sheet S to advance from the vertical path 58 to the inversion path 59, but makes it impossible for the sheet S to enter from the inversion path 59 to the vertical path 58. Further still, a detection lever 65 is provided for detecting that the trailing edge of the sheet has passed the point P.

The sheet S that has been conveyed in the direction of arrow b due to the reverse rotation of the pair of reverse rollers 63 is sent into a re-feeding path 67. Then it is relayed by multiple pairs of conveyance rollers 68 inside the re-feeding path and the pair of conveyance rollers 11 and sent to the pair of registration rollers 12 to undergo image forming again. In this manner, the sheet S is sent to the secondary transfer portion T2 after its diagonal traveling condition has been corrected by the registration rollers 12. Then a second instance of image forming is carried out based on image data stored in an image memory (not shown) on which main scanning direction and sub-scanning direction scaling ratio correction has been carried out. Thereafter, the sheet S undergoes the same processing as for one-side image forming, and is discharged outside the apparatus.

Next, description is given of the scanner unit 22 in which the photosensitive drums are exposed.

FIG. 2 is a diagram that schematically shows a configuration of one color portion of the scanner 22 shown in the convention example of FIG. 1.

The electrophotographic image forming apparatus is provided with an exposure unit that irradiates laser light onto a photosensitive drum 215 (corresponding to each of the photosensitive drums 14, 15, 16, and 17) as shown in FIG. 2 so as to form a latent image on the photosensitive drum 215 corresponding to the inputted image data. The exposure unit is provided with a laser light source 210 for emitting diffused laser light. The laser light emitted from the laser light source 210 is converted to a parallel laser light L1 via a collimator lens 211. The laser light L1 is irradiated onto a polygon mirror 213 that is being rotationally driven by a scanner motor 212. Then, the laser light L1 that has been irradiated onto the polygon mirror 213 is reflected by the polygon mirror 213 and guided to an f-θ lens 214. The laser light that has passed through the f-θ lens 214 is made to perform combined scanning on the photosensitive drum 215 at a uniform velocity in the main scanning direction, and a latent image 216 is formed on the photosensitive drum 215 due to the scanning of the laser light, that is, due to the scanning operation. The commencement of the scanning operation of the laser light is detected by a beam detect sensor (hereinafter referred to as BD sensor) 217. The laser light source 210 is forcibly turned on at a time aligned with the commencement of scanning of the laser light on the photosensitive drum 215. In this way, in the period in which the laser light source 210 is forcibly turned on, the BD sensor 217 detects the laser light that has been inputted by being reflected by the polygon mirror 213, and outputs a beam detect signal (hereinafter referred to as a BD signal), which is a reference signal for the timing of writing in image forming for each main scanning line.

However, in the above-described conventional example, the scaling ratio in the sub-scanning direction is fixed, and therefore there have been the following problems. For example, the following two large problems involve driving the intermediate transfer belt.

Due to problems such as geometrical shape deviation between the drive roller 13*a* and the idler roller 13*c*, the velocity of the intermediate transfer belt 13 changes from time to time. For this reason, positional differences are produced in successively formed images on the intermediate transfer belt 13 compared with the ideal image forming position in the movement direction of the intermediate transfer belt 13, that is, in the sub-scanning direction on the sheet. In particular, in the case of an apparatus capable of forming a full color image by superimposing four color images as in the conventional example, there is a problem that poor color registration occurs and image quality deteriorates. Some of the main causes of this are as follows.

(1) A movement velocity V of the intermediate transfer belt prescribed by a drive roller driven at a constant angular velocity ω and having a radius r, with a thickness h of the intermediate transfer belt is expressed as follows.

$$V=(r+h)\times\omega \qquad \text{expression (1)}$$

When an eccentricity Δr is superposed to the drive roller 13*a*, a fluctuation ΔV of the movement velocity V of the intermediate transfer belt 13 prescribed by the drive roller 13*a* is expressed as follows.

$$\Delta V\omega=\Delta r\omega\times\omega \qquad \text{expression (2)}$$

Here ω indicates angular velocity (rotation period of the drive roller).

Due to the velocity fluctuation ΔVω in the rotation period of the drive roller 13*a*, a positional displacement in each image of the colors is produced at the rotation period of the drive roller 13*a*.

(2) Furthermore, change in the movement velocity of the intermediate transfer belt prescribed by the drive roller is produced also by fluctuation in the thickness direction extending over the entire circumference of the intermediate transfer belt. As a result, the images of each color on the sheet, which have been transferred as a batch from the intermediate transfer belt, are displaced from their ideal positions and image quality deteriorates. There is also a problem of fluctuation in the positions of images formed on a plurality of sheets.

Now assume that when the drive roller of a radius r is driven at a constant angular velocity ω, thickness fluctuation Δh is present extending along the entire circumference of the intermediate transfer belt that winds around the drive roller and has a thickness h. In this case, a fluctuation ΔVL in the movement velocity V of the intermediate transfer belt driven by the drive roller is expressed by expression (3).

$$\Delta VL=\Delta hL\times\omega \qquad \text{expression (3)}$$

Here L indicates the entire circumferential length of the intermediate transfer belt.

FIGS. 3 and 4 schematically express an ideal case of linear velocity fluctuation of the belt prescribed by the drive roller and the positional displacement relationship of images that are thereby formed, and a case including the aforementioned problems. In FIGS. 3 and 4, the exposure timing of each exposure device is shown. The movement velocity of the intermediate transfer belt is indicated by a time t on the horizontal axis and a linear movement velocity v of the belt is shown on the vertical axis. The scanning lines of each color formed on the intermediate transfer belt are shown in parallel in the main scanning direction, with these being shown as they are written in a time series.

FIG. 3 shows an ideal case in which the intermediate transfer belt moves at a constant velocity V. Here, a case is shown in which a movement time gap is set corresponding to installation spacings between the image forming apparatuses of each of the colors YMCK on the intermediate transfer belt, which moves at constant velocity, and each portion of writing in the main scanning direction is set in regular spacing times in the sub-scanning direction. As a result, it is evident that each of the YMCK color scanning lines is written having regular spacings in the sub-scanning direction without displacement.

In contrast to this, FIG. 4 shows a case in which the velocity of the intermediate transfer belt changes due to the thickness of the intermediate transfer belt and eccentricity of the drive roller. Small AC component fluctuation of the velocity fluctuation of the intermediate transfer belt shown by the solid line corresponds to an eccentric cycle of the drive roller, and the large undulating component shown by the dashed line pertains to velocity fluctuation corresponding to a cycle of thickness unevenness of the intermediate transfer belt.

In this case, even when the scanning lines of each color are formed having regular spacings in the sub-scanning direction, there is misalignment in the sub-scanning spacings of the scanning lines corresponding to the amount of velocity fluctuation in the intermediate transfer belt. Furthermore, as a result of this condition occurring for each color respectively, poor color registration is produced among the YMCK colors.

Japanese Patent Laid-Open No. 2004-102039 proposes a method to counter this problem in which the rotation velocity of the polygonal mirror scanner motor is controlled to carry out sub-scanning direction scaling ratio correction. However, there are limitations in the speed of response of the rate of rotation of the motor. For this reason, although this method is effective against long period scaling ratio unevenness, it is has a poor effect against positional displacement in short period scaling ratio unevenness.

Furthermore, there is also a problem of front to back displacement in images during double sided printing. Ordinary sheets such as paper are known to expand or contract slightly (2% or less) due to changes in the amount of water contained in the sheet due to the application of heat during fixing. In other words, image expansion or contraction occurs along with expansion or contraction of the sheet after forming and fixing an image on the front side of the sheet. After this, when image forming is carried out on the reverse side of the sheet while the expansion/contraction has not returned to normal, an image is formed and fixed on the expanded or contracted sheet. After a certain time after this, when the amount of water in the sheet is restored and the image scaling ratio of the front side image has returned to its original size, the image on the reverse side conversely contracts or expands undesirably, which produces slight inconsistencies in the scaling ratios between the front and reverse sides.

Along with higher image quality in recent years, a need has arisen to correct these slight inconsistencies in the scaling ratios. As mentioned above, methods have also been proposed to counter this problem by controlling the rotation velocity of the polygonal mirror scanner motor to carry out sub-scanning direction scaling ratio correction. However, this necessitates changing the rotational speed of the motor between sheets such that an unnecessary time for changing speed between sheets must be maintained. This has an adverse effect on printing efficiency.

SUMMARY OF THE INVENTION

It is desirable to eliminate the above-mentioned conventional problems.

One embodiment of the invention of the present application uses a plurality of laser elements capable of scanning and exposing a plurality of scanning lines simultaneously and selectively drives these laser elements, thereby varying the sub-scanning direction resolution of the image to be formed and enabling the sub-scanning direction size of the image to be adjustable.

According to an aspect of the present invention, there is provided an image forming apparatus for forming an image using an electrophotographic method, comprising:

a scanning unit having a plurality of laser elements capable of scanning a plurality of lines in parallel in a sub-scanning direction at a second resolution, which is higher than a first resolution of an image to be formed in a main scanning direction, a scaling ratio setting unit configured to set a scaling ratio of an image in the sub-scanning direction in response to the first and second resolutions and an image size for image forming, a drive control unit configured to perform control so as to select and drive any of the plurality of laser elements of the scanning unit in response to the scaling ratio that has been set by the scaling ratio setting unit, and an image forming unit configured to form on a print medium an image of lines scanned by the scanning unit using laser elements driven by the drive control unit.

According to another aspect of the present invention, there is provided an image forming apparatus comprising:

an image forming unit having a plurality of scanning-line generating portions, each operable, in dependence upon image data applied thereto, to cause a light beam to scan across an image bearing member along a scanning line, the scanning lines of the plurality of scanning-line generating portions being parallel to one another and being spaced apart one from the next by a predetermined pitch that is smaller than a line pitch of the image data; and a line-pitch adjustment unit, connected for receiving the image data and pitch adjustment data for adjusting a pitch of the scanning lines, configured to be operable to control the application of the image data to the plurality of scanning-line generating portions such that the image data of two successive lines of the image data is applied to scanning-line generating portions whose respective scanning lines are spaced apart by a spacing different from the image-data line pitch.

Further features and aspects of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Numerous embodiments of the present invention will now herein be described below in detail with reference to the accompanying drawings. The following embodiments are not intended to limit the claims of the present invention, and not all combinations of features described in the embodiments are essential to the solving means of the present invention.

In order to achieve higher speeds and higher image quality in printers and copiers in recent years, many techniques have been implemented in which exposure of multiple lines is carried out in a single scan using a rotating polygonal mirror by making multiple the number of beams of the semiconductor laser (laser element) used as the laser light source. In particular, surface emitting lasers have been put to practical use, shifting from edge emitting lasers, thereby simplifying multi-beam implementations.

Figure 1:
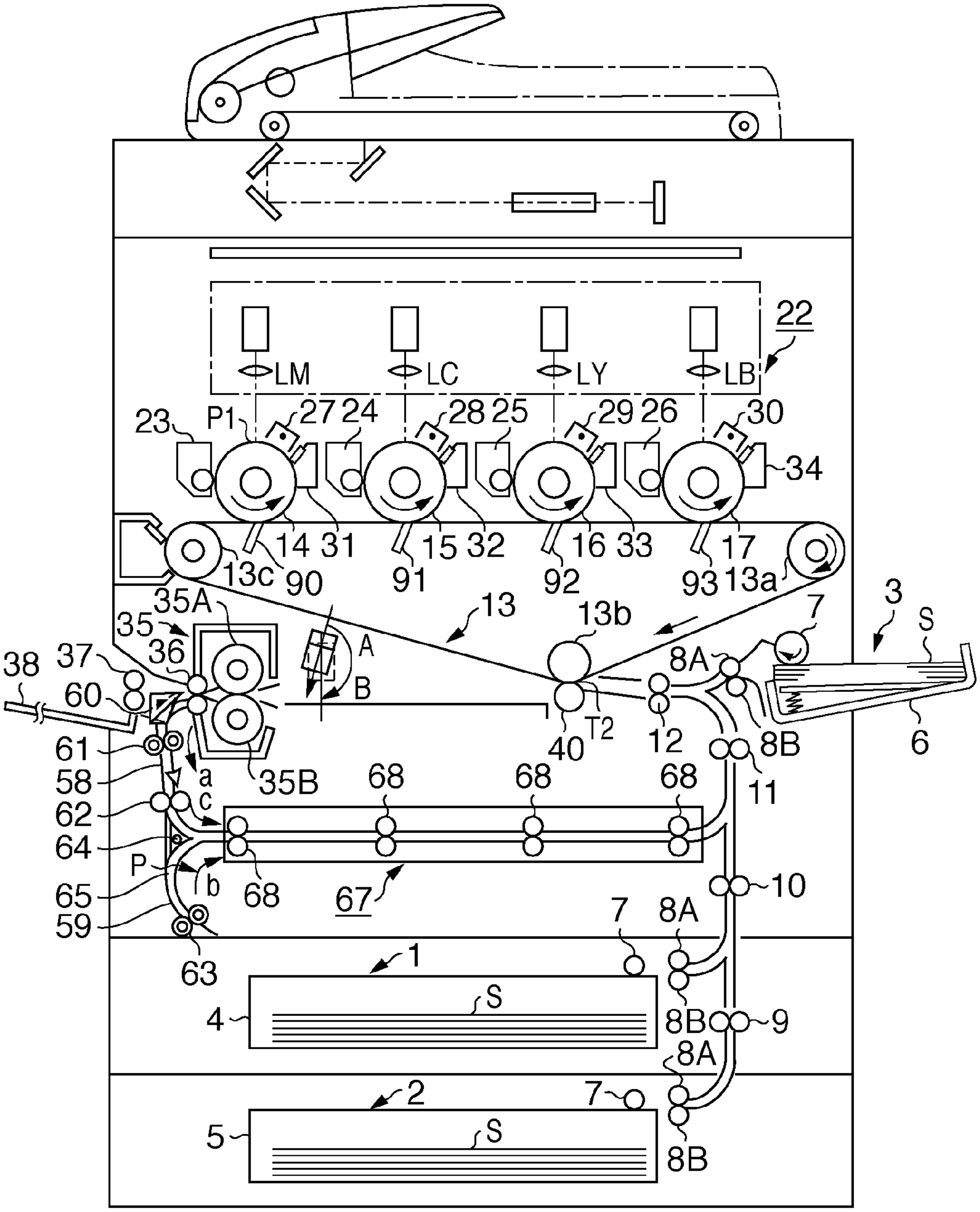
FIG. 1 (Prior Art)
FIG. 1 is a diagram illustrating a configuration of a conventional color image forming apparatus.
Figure 2:
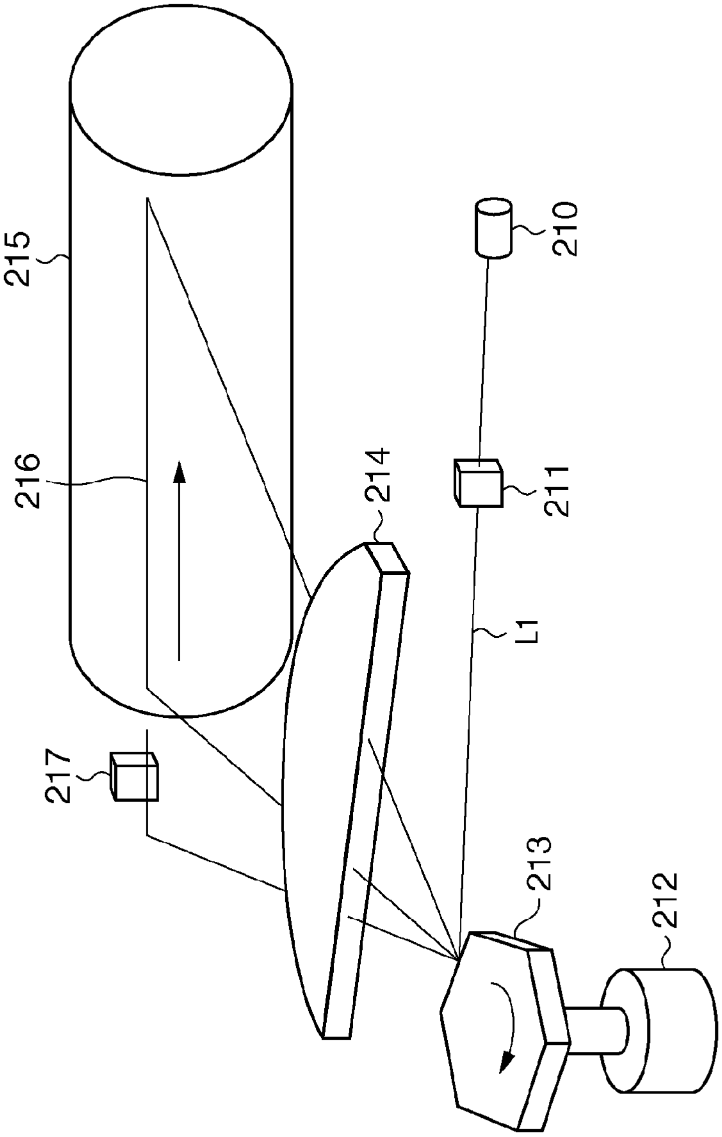
FIG. 2 (Prior Art)
FIG. 2 is a diagram that schematically shows a configuration of one color portion of the scanner shown in FIG. 1.
Figure 3:
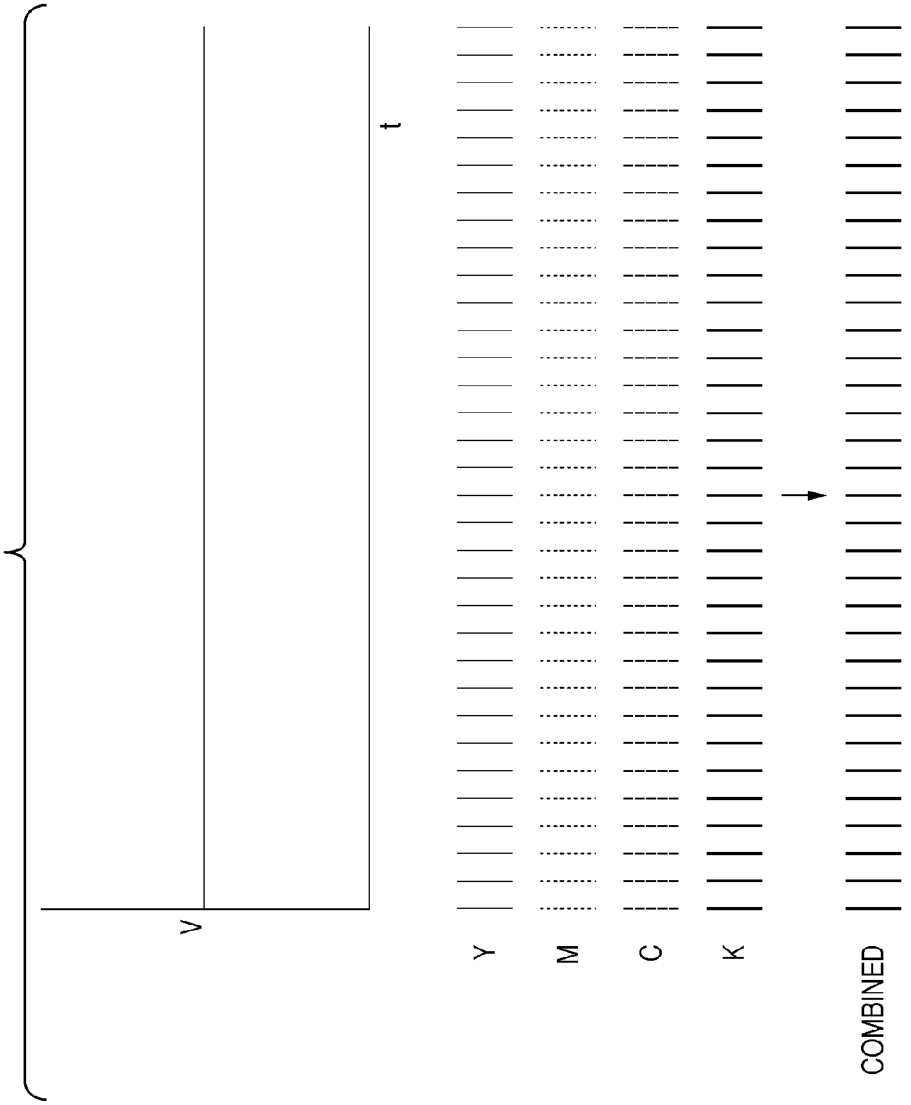
FIG. 3 (Prior Art)
FIG. 3 is a diagram showing a relationship of image positional displacement and shows an ideal case.
Figure 4:
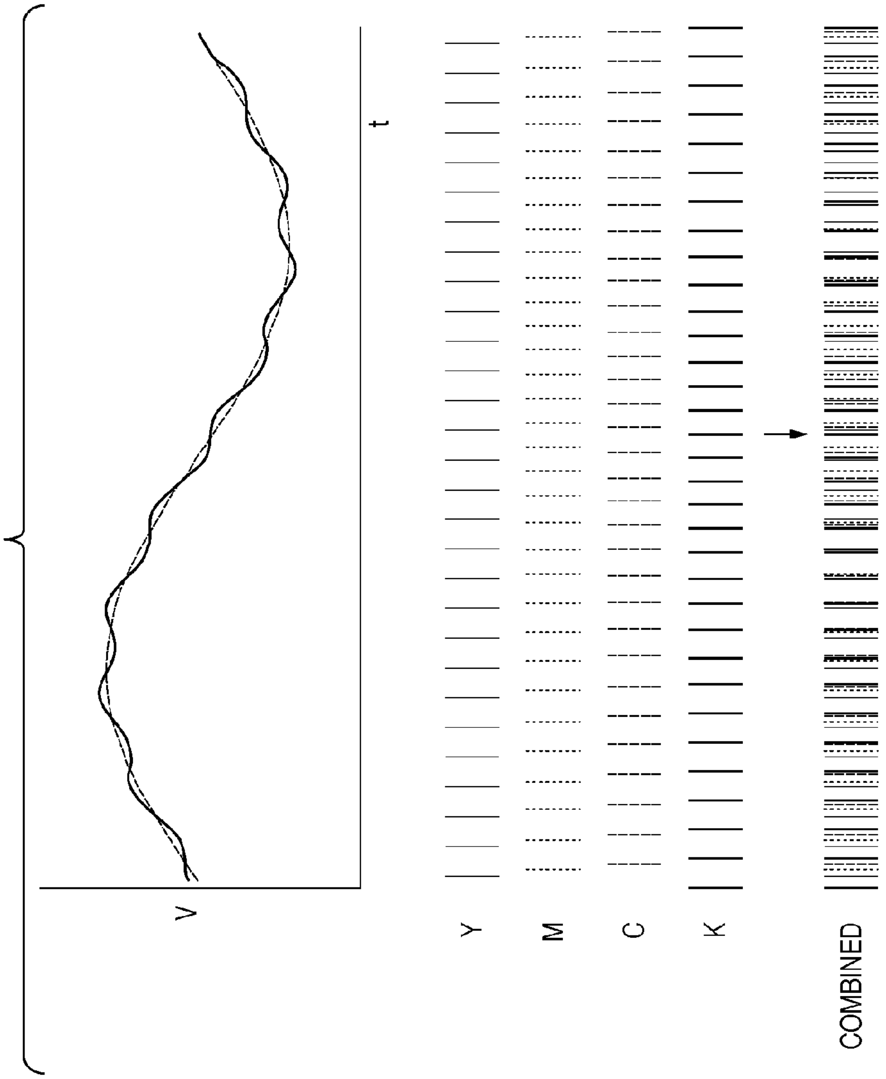
FIG. 4 (Prior Art)
FIG. 4 is a diagram that schematically shows a relationship of image positional displacement.

Hereinafter an example is described in which a multi-beam type of semiconductor laser is used in an image forming apparatus. It should be noted in regard to the configuration of the image forming apparatus according to this embodiment that, other than that the scanner unit 22 uses a multi-beam type of semiconductor laser, the configuration is common to the aforementioned configuration of the image forming apparatus shown in FIG. 1. It should also be noted that FIG. 1 shows an example in which an intermediate transfer member is used, but a method in which transfer is performed directly onto the sheet from a photosensitive member is also possible.

Figure 5:
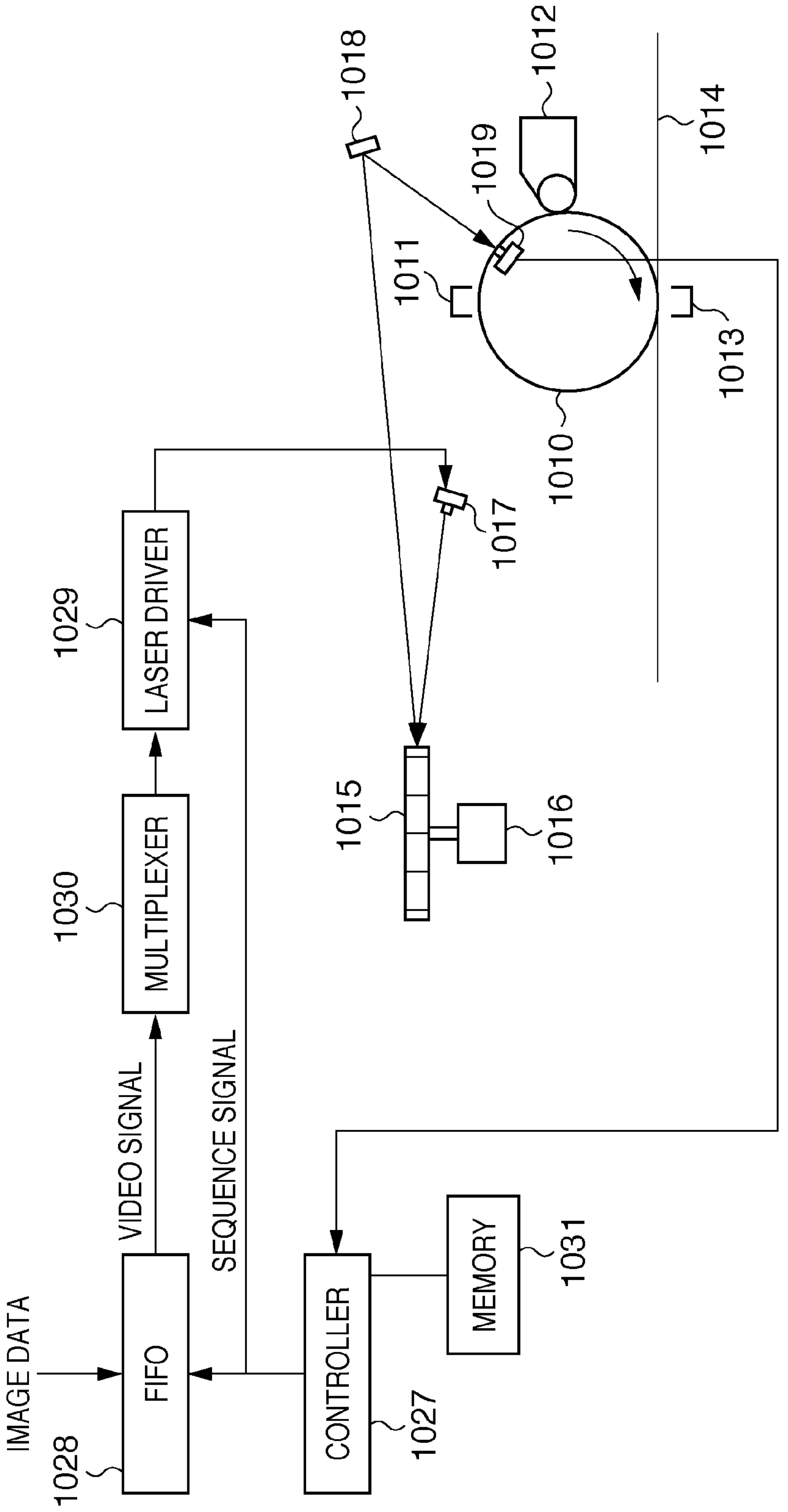
FIG. 5 is a diagram for describing principal components of an image forming portion of an electrophotographic printer that uses a multi-beam type of semiconductor laser according to an exemplary embodiment.

FIG. 5 is a diagram for describing principal components of an image forming portion of an electrophotographic printer that uses a multi-beam type of semiconductor laser according to the present embodiment.

In FIG. 5, numeral 1015 denotes a rotating polygonal mirror and numeral 1016 denotes a laser scanner motor that rotationally drives the polygonal mirror 1015. Numeral 1017 denotes a laser diode, which is the light source for exposure. The laser diode 1017 is driven by a laser driver 1029 to turn on or off in response to image signals. The optically modulated laser lights emitted from the laser diode 1017 are irradiated toward the rotating polygonal mirror 1015.

Accompanying the rotation of the rotating polygonal mirror 1015, the laser lights emitted from the laser diode 1017 are respectively reflected by the reflection planes thereof as respective deflected beams having a continuously changing angle. The reflected lights undergo corrections for distortion aberration and the like by a lens group (not shown) then travel via a reflector 1018 to scan the main scanning direction of a photosensitive drum 1010 (a perpendicular direction with respect to the diagram). One side of the rotating polygonal mirror 1015 corresponds to one time of scanning. Accordingly, in a case where eight beams are emitted from the laser diode 1017, eight lines of laser light scan the main scanning direction of the photosensitive drum 1010 in parallel by one rotation of the rotating polygonal mirror 1015.

The surface of the photosensitive drum 1010 is charged in advance by a charger 1011 and is successively exposed by the scanning of the laser lights to form electrostatic latent images of plural lines. Furthermore, the photosensitive drum 1010 rotates in the direction of the arrow so that the electrostatic latent images that have been formed by the laser lights are developed by toner supplied from a developer 1012. A visible image, which has been developed in this manner, is transferred by a transfer charger 1013 to a belt 1014, which is an intermediate transfer member. In this manner, a toner image on the belt resulting from the transfer of the visible image is transferred and fixed to a sheet at a secondary transfer portion, after which the sheet is discharged outside the apparatus.

Here, a BD sensor 1019 is arranged in a position near or corresponding to a scanning commencement position in the main scanning direction at a lateral portion of the photosensitive drum 1010. Each of the laser lights reflected by each of the reflection planes of the rotating polygonal mirror 1015 is detected by the BD sensor 1019 prior to its scan. A BD signal that has been detected in this manner is inputted to a controller 1027 as a scanning commencement reference signal of the main scanning direction. The controller 1027 generates and controls timing signals of a FIFO 1028 and a laser driver 1029 synchronized with a data writing commencement position in the main scanning direction of each line using the signal of the BD sensor 1019 as a reference.

A memory 1031 stores data indicating fluctuation amounts of size in the sub-scanning direction, which changes cyclically, for the images formed by an image forming means (image forming mechanism including the aforementioned photosensitive drum 1010 and the transfer belt 1014). In this way, the controller 1027 controls the switching of lines to be enabled by a multiplexer 1030, which is described later with reference to FIGS. 10A-11C, in accordance with the data that is stored, thereby adjusting the resolution in the sub-scanning direction.

Furthermore, in addition to this, a detector (not shown) may be provided that detects fluctuation amounts of the size in the sub-scanning direction of the images formed by the image forming means, which change cyclically. In this way, the controller 1027 controls the switching of lines to be enabled by the multiplexer 1030 in accordance with the detected fluctuation amounts, thereby adjusting the resolution in the sub-scanning direction. It should be noted that this detector may include a function for detecting a disparity (expansion/contraction ratio) during double sided printing between a size of the sheet (print medium) when the front side is printed and a size of the sheet when an image is formed on the back side of that sheet after fixing. This allows differences in image size between the front side and the back side of the sheet during double sided printing to be corrected.

In this manner, by generating light pulse signals for the semiconductor laser based on the electrical image signals using the semiconductor laser drive circuit, image exposure is carried out on the photosensitive member to form an image.

Figure 6:
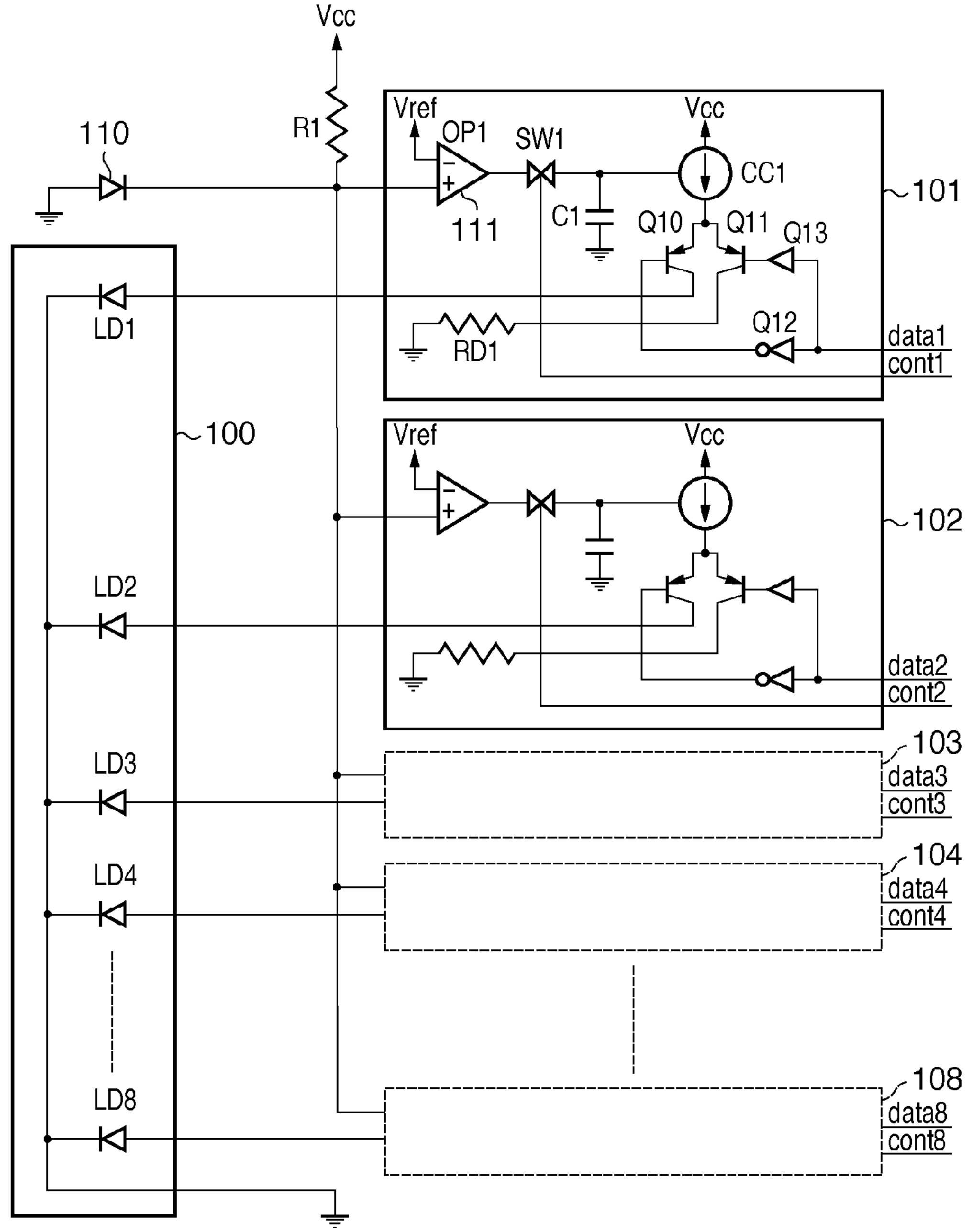
FIG. 6 is a diagram showing a multi-beam type of semiconductor laser and driver circuits thereof according to the present embodiment.

FIG. 6 is a diagram showing a multi-beam type of semiconductor laser and driver circuits thereof (corresponding to the laser driver 1029 in FIG. 5) according to the present embodiment.

The laser diode 1017 in FIG. 5 corresponds to a semiconductor laser 100 in FIG. 6. In the semiconductor laser 100, eight lasers LD1 to LD8 are arranged inside a package. Cathode terminals of the lasers LD1 to LD8 are grounded via a common terminal. Furthermore, anode terminals of the lasers LD1 to LD8 are connected to driver circuits 101, 102, 103, 104, . . . , 108 respectively and are supplied with a lighting current by the corresponding driver circuits. The driver circuits are equivalent circuits respectively, and description of their operations is given here using the driver circuit 101 as a representative example.

In order to monitor the amounts of light of each of the lasers LD1 to LD8, a photodiode 110 is arranged in a position where emitted light of the lasers LD1 to LD8 or a portion thereof is irradiated. An anode terminal of the photodiode 110 is grounded and its cathode terminal is connected to an electric power source voltage Vcc via a resistor R1. The cathode terminal is the output for monitoring. And the cathode terminal of the photodiode 110 is connected to a + input (non-inverted) terminal of an op-amp 111 (OP1). Furthermore, a reference voltage Vref is applied to the – input terminal of the op-amp 111.

The output terminal of the op-amp 111 is inputted to an analog switch SW1. A signal cont1, which is a control signal supplied from the controller 1027, is inputted to a control terminal that controls the operation of the analog switch SW1. The output of the analog switch SW1 is connected to one end of a capacitor C1 and moreover is inputted as a control signal of a constant current source CC1. The other end of the capacitor C1 is grounded. The constant current source CC1 outputs a current in response to a voltage (control voltage) applied via the analog switch SW1. Emitter terminals of PNP transistors Q10 and Q11 are connected respectively to the output of the constant current source CC1. A collector terminal of the PNP transistor Q10 is the output of the driver circuit 101 and connects to the anode terminal of the laser LD1. A resistor RD1 is connected to the collector terminal of the PNP transistor Q11 and the other end of the resistor RD1 is grounded. A signal data1 (image data) is inputted via an inverter Q12 to a base terminal of the PNP transistor Q10. Furthermore, the signal data1 is inputted via a buffer Q13 to a base terminal of the PNP transistor Q11. The signal data1 is supplied from the FIFO 1028 shown in FIG. 5. The configurations of the other driver circuits are the same. Next, description is given regarding the operation of this circuit.

First, the controller 1027 outputs the signal cont1 and the signal data1 together at high level to start an auto power control (APC) mode of the laser LD1. At this time, signals cont2 to cont8 and signals data2 to data8 are outputted at low level.

Since the signal data1 is high level at this time, the output of the inverter Q12 is low level and the PNP transistor Q10 goes on. Furthermore, the PNP transistor Q11 conversely goes off. When the PNP transistor Q10 goes on in this manner, the laser LD1 lights up due to the current supplied by the constant current source CC1. Then, when the amount of laser light emitted from the laser LD1 increases, the current flowing to the photodiode 110 increases and the voltage inputted to the op-amp 111 decreases. The op-amp 111 compares the voltage of the photodiode 110 and the reference voltage Vref, and operates so that the output voltage of the op-amp 111 decreases when the voltage of the photodiode 110 decreases. When the output voltage of the op-amp 111 decreases in this manner, the control voltage of the constant current source CC1 decreases such that its output current also decreases. When the output current of the constant current source CC1 decreases in this manner, the drive current of the laser LD1 also decreases and the amount of laser light emitted from the laser LD1 also decreases.

The driver circuit 101 achieves APC using a negative feedback circuit in the above-described manner, and the lighting up of the laser LD1 is driven such that the output of the photodiode 110 and the reference voltage Vref are equivalent. The drive control of the lasers LD2 to LD8 by the other driver circuits 102 to 104 and 108 is also the same.

Next, description is given regarding operation during printing.

In printing mode, the signal cont1 to signal cont8 are set to low level by the controller 1027, and the image data for image forming is outputted in the signals data1 to data8.

Since the signal cont1 is low level here, the analog switch SW1 is off. For this reason, the voltage during APC mode is held by the capacitor C1. And since the voltage that charges the capacitor C1 is applied to the control terminal of the constant current source CC1, the output of the constant current source CC1 becomes the same electric current value as during APC mode.

When the signal data1 is high level, the PNP transistor Q10 goes on, and therefore the laser LD1 lights up. Conversely, when the signal data1 is low level, the PNP transistor Q10 goes off, and therefore the laser LD1 turns off. In this way, the driving for turning on and off the laser LD1 can be achieved using the image data (data1), and exposure and scanning can be carried out in response to the image data. Furthermore, it is generally known that semiconductor lasers emit a constant amount of laser light as long as their drive current values are identical in an identical environment. In this way, during lighting, the laser can be driven to have a constant amount of light equivalent to APC mode.

Also, when the signal data1 is high level, the PNP transistor Q11 goes off, and when the signal data1 is low level, the PNP transistor Q11 goes on. Thus, when the signal data1 is low level, the current supplied from the constant current source CC1 is applied to the resistor RD1. In this way, the current is always supplied by the constant current source CC1 without being affected by the condition of the signal data1, and it electric current value becomes constant. Generally, difficulty is involved in high speed driving with a constant current source, in particular the switching operations at several tens of MHz for carrying out image forming. However, with this configuration, although the PNP transistors Q10 and Q11 require high speed switching operations, the constant current source CC1 does not require high speed switching operations, and therefore image forming is easier. Printing with the other lasers LD2 to LD8 is also the same.

Figure 7:
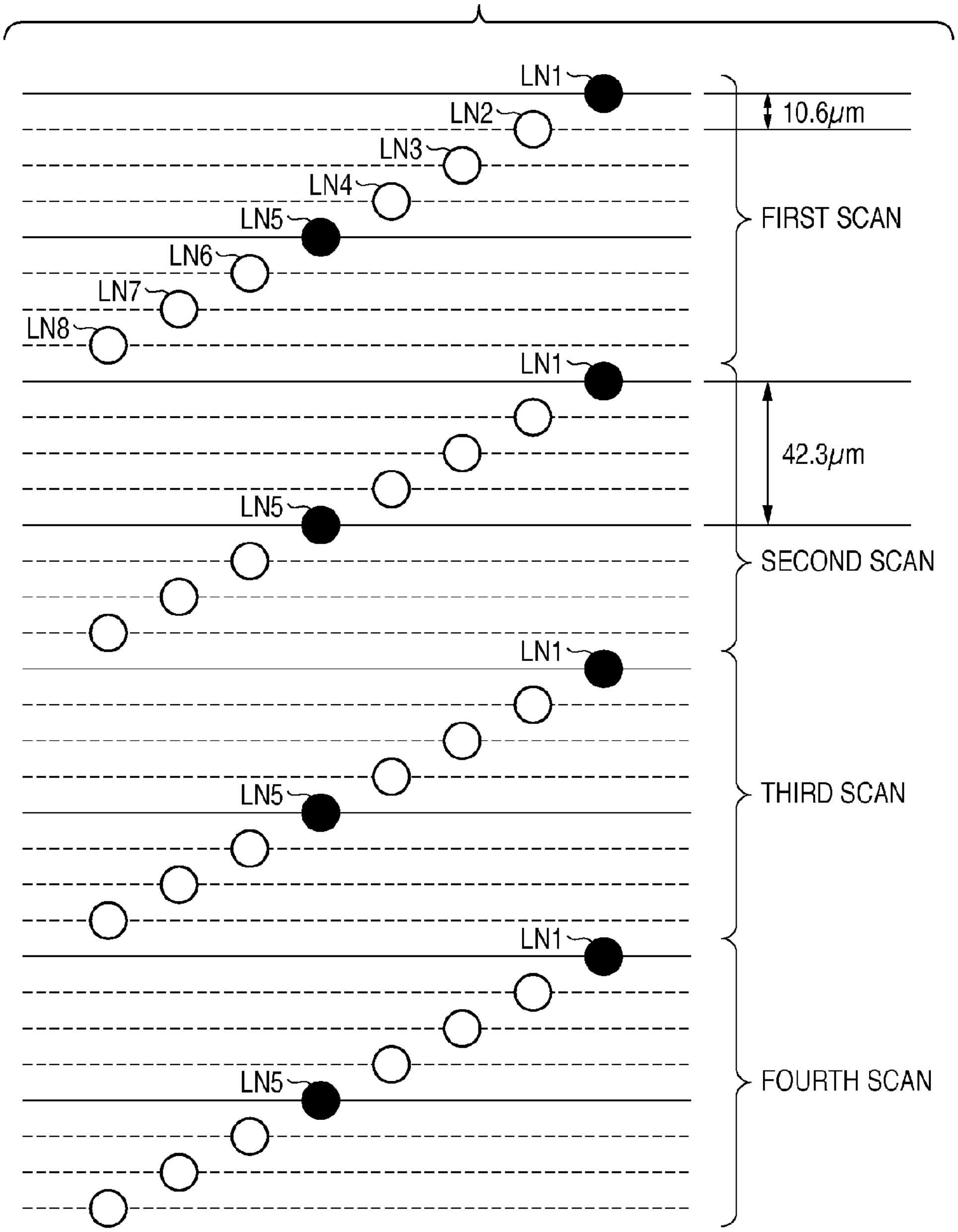
FIG. 7 is a diagram for describing image forming in the sub-scanning direction when using eight lasers LD1 to LD8 according to a first embodiment.

Next, with reference to FIG. 7, description is given of a laser driving method for adjusting the sub-scanning direction resolution of an image to be formed when using a multi-beam laser.

FIG. 7 is a diagram for describing image forming in the sub-scanning direction when using the eight lasers LD1 to LD8. Here description is given of a case where the resolution of lines in the sub-scanning direction (vertical direction in FIG. 7) to be formed by these lasers is four times the resolution of the main scanning direction (horizontal direction in FIG. 7).

In FIG. 7, the lines indicated LN1 to LN8 indicate lines that are scannable by the eight lasers LD1 to LD8 in one time of laser scanning. Here the resolution (second resolution) of the lines LN1 to LN8 is set to four times the resolution (first resolution) of the image data. That is, in a case where the resolution of the image data is 600 dpi, the resolution (sub-scanning direction resolution) of the laser diode 1017 becomes 2,400 dpi. In FIG. 7, the solid lines indicate exposure lines for which lighting-driving of the laser is enabled and the dashed lines indicate lines for which the lasers are not lit. Here the spacing for each scanning line (predetermined pitch) is approximately 10.6 μm when the resolution is 2,400 dpi.

In the example of FIG. 7, exposure lines for which lighting-driving of the lasers is enabled in a first scan are the lines LN1 and LN5 indicated by solid lines. The exposure lines LN1 and LN5 correspond to the lasers LD1 and LD5. In this way, by exposing with the lasers for every four lines in the sub-scanning direction, the sub-scanning direction resolution becomes 2,400/4, that is, a resolution of 600 dpi, which matches the resolution (line pitch) of the image data, and the spacing of exposure lines formed in the sub-scanning direction becomes approximately 42.3 μm.

Next, similarly for the second scan, the exposure lines for which lighting-driving of the lasers is enabled are the lines LN1 and LN5 indicated by solid lines. Thereafter, similarly for the third and fourth scans, exposure lines are set for which lighting-driving of the lasers is enabled.

An image that is scanned and exposed in this manner is exposed with a line spacing that is always uniform in the sub-scanning direction in the first scan, the second scan, and so on. In a case where there is no influence of thickness unevenness in the belt driving and expansion/contraction in the transfer paper or the like in subsequent image forming processes and it is unnecessary to correct the image size in the sub-scanning direction, an image can be obtained having a same resolution in the main scanning direction and the sub-scanning direction by driving the lasers as in FIG. 7.

However, in a case where there is a difference from the intended resolution of the image data due to influences of thickness unevenness in the belt driving and expansion/contraction in the transfer paper (sheet) or the like, it is necessary to perform control so that the sub-scanning direction pitch spacing is corrected. Description is given of operations in a case where this correction control is carried out with reference to FIGS. 8 and 9.

Figure 8:
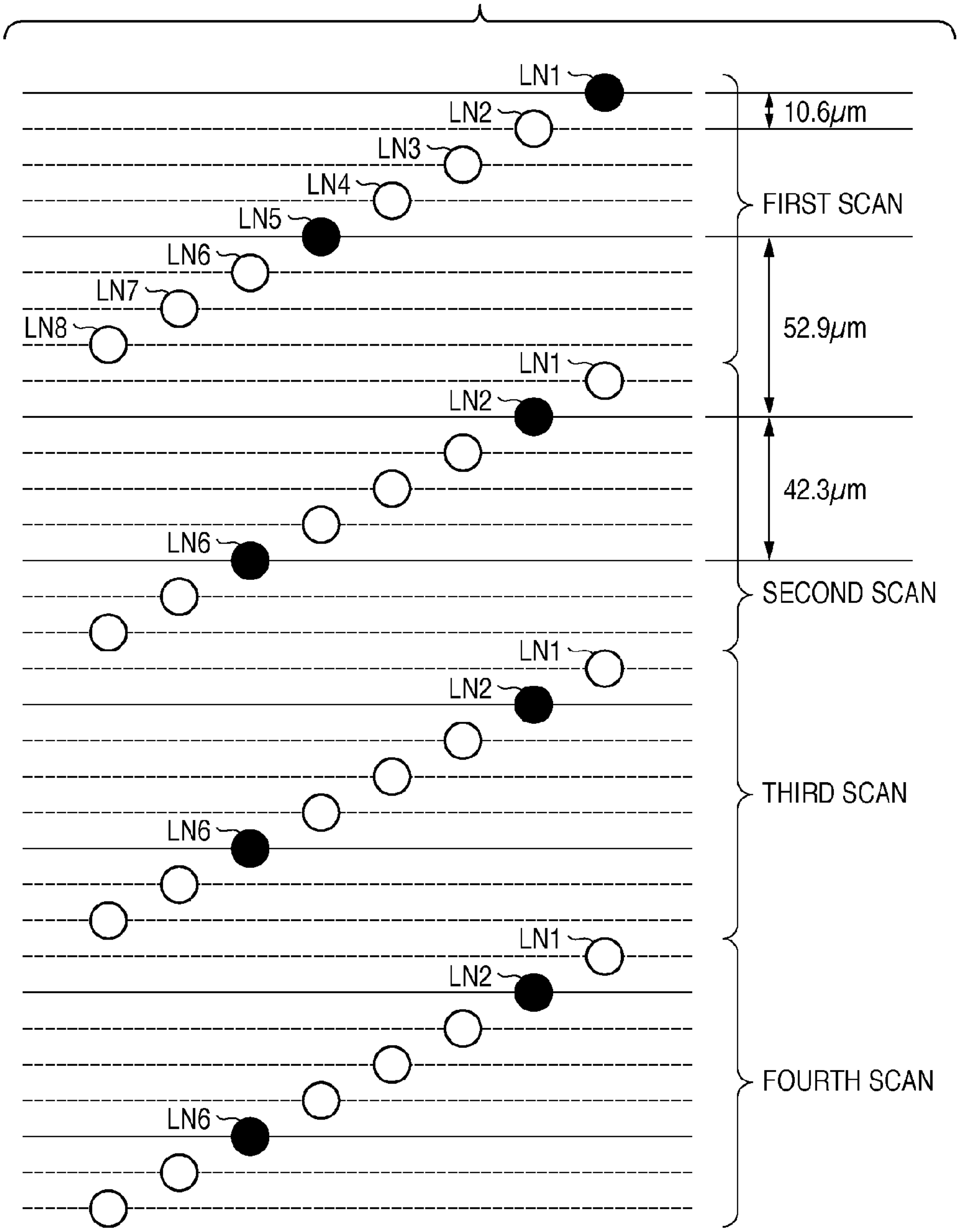
FIG. 8 is a diagram for describing an operation in a case where an expansion correction is carried out to widen a line spacing from the state shown in FIG. 7.

FIG. 8 is a diagram for describing an operation in a case where an expansion correction is carried out to widen an exposure line spacing from the state shown in FIG. 7. In FIG. 8, in addition to ordinarily enabling one line in every four lines as in FIG. 7 to match the main scanning direction resolution, a four line gap is created between the exposure lines of the first scan and the second scan to expand the image in the sub-scanning direction. In other words, ordinarily the image data of two successive lines are applied to laser elements whose scanning lines are spaced apart by 4 lines. This corresponds to a first scanning cycle. As an alternative, the image data of two successive lines can be applied to laser elements whose scanning lines are spaced apart by 5 lines. This corresponds to a second scanning cycle. Here, a scanning cycle is 4 or 5 scanning lines and corresponds to one line of the image data, whereas the 8 lines of the "first scan", "second scan", "third scan" etc. in FIG. 8 correspond to the 8 laser elements (scanning-line generating portions). In FIG. 8 also, the solid lines indicate exposure lines for which lighting-driving of the laser is enabled and the dashed lines indicate lines for which the lasers are not driven. In the first scanning cycles, as in FIG. 7, the pitch spacing of the scanning lines is approximately 10.6 μm when the resolution is 2,400 dpi.

During the second time line scanning, the lasers whose lighting-driving is enabled are LD2 and LD6, and the exposure lines are the lines LN2 and LN6 indicated by solid lines. Next, in the third scan, the exposure lines are the lines LN2 and LN6 indicated by solid lines as in the second scan (and these correspond to the lasers LD2 and LD6). The exposure lines of the fourth time are similarly scanned successively in this manner.

The 5 lines starting from LN5 in the first scan and ending with LN1 in the second scan correspond to the above-mentioned second scanning cycle. Only 1 of the 5 lines is enabled, namely the line LN5, and the second line of image data is applied to the line LN5. The image that is scanned and exposed in this manner has an exposure line spacing in the sub-scanning direction between the first scan and the second scan (a spacing between LN5 to which the second line of image data is applied and LN2 to which the third line of image data is applied) that is approximately 52.9 μm (which equals approximately 42.3 μm+spacing corresponding to one scanning line), and the image is longer compared to the case shown in FIG. 7. That is, compared to the case shown in FIG. 7, there is an expansion of approximately 25% in the spacing between the scanning lines for the second and third lines of image data. However, the exposure lines before and after this are scanned with a spacing of approximately 42.3 μm (600 dpi) as in FIG. 7. Thus, for the image as a whole the sub-scanning direction scaling ratio is determined by a frequency at which the second cycles are provided among the first scanning cycles.

In other words, when performing expansion by using a second scanning cycle once in every n scanning cycles (e.g. (n−1) first scanning cycles followed by one second scanning cycle), and when the first scanning cycles have 4 lines and the second scanning cycles have 5 lines, the expansion scaling ratio for the image as a whole can be expressed as:

$$25 \div n\ (\%)$$

For example, by expanding an image in the sub-scanning direction by a spacing corresponding to one line at a frequency of once in every 25 lines of image data (every 25 scanning cycles) and making "normal" exposure line spacings of 4 lines in the sub-scanning direction for the remaining 24 image-data lines, it is possible to expose an image that is expanded by 1% in the sub-scanning direction. The exposure lines (laser elements) to be driven are selected in response to the scaling ratio (scaling ratio setting) that is set in this manner.

A method for controlling the LD lighting at this time is described with reference to FIGS. 10A to 10C.

Figure 10A:
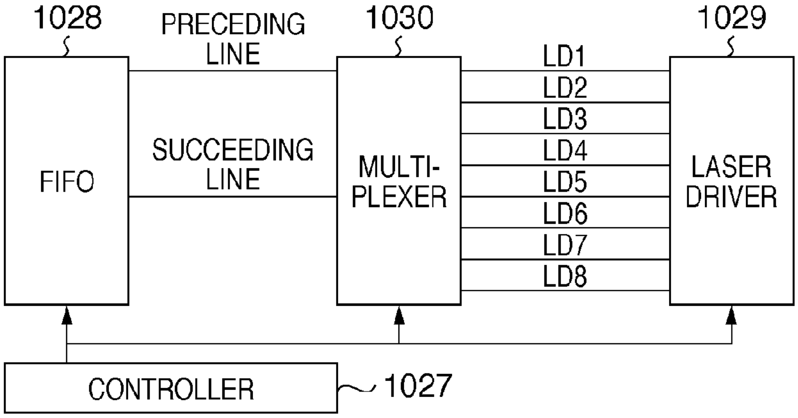
FIGS. 10A to 10C are diagrams for describing switching of laser driving for each scan shown in FIG. 8.
Figure 10B:
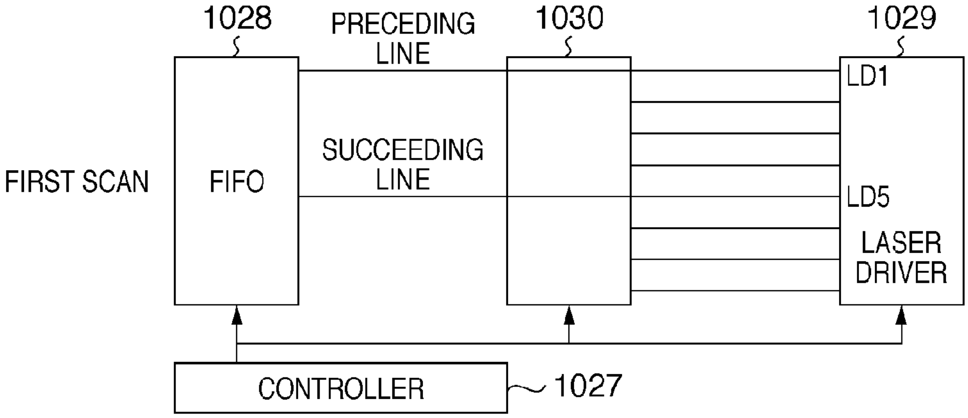
Figure 10C:
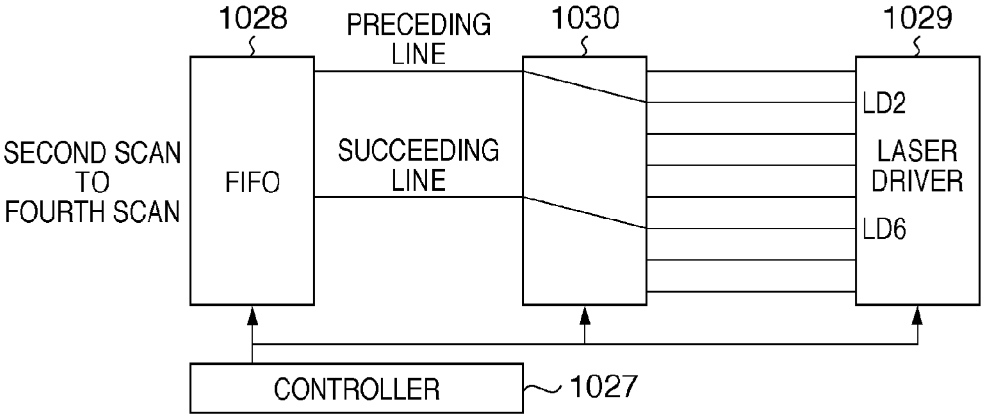

FIGS. 10A to 10C are diagrams for describing switching of laser driving for each scan shown in FIG. 8. It should be noted that portions common to FIG. 5 are shown using identical reference symbols.

FIG. 10A is a block diagram that illustrates routes by which image data in the FIFO 1028 is supplied to the laser driver 1029.

Data of two lines, which are a preceding line (line LN1 in the first scan of FIG. 8) and a succeeding line (line LN5 in the first scan of FIG. 8), is inputted from the FIFO 1028 to a multiplexer 1030. The multiplexer 1030 selects a laser driver to output the line data that is inputted in accordance with a control signal from the controller 1027, thereby selecting one or more lasers to be driven among LD1 to LD8. In this way, the lasers selected by the multiplexer 1030 are enabled, and the lasers undergo lighting-driving in response to the image data.

FIG. 10B shows a switching process by the multiplexer 1030 during the first scan in FIG. 8. Here, the preceding line is supplied to the laser LD1 and the succeeding line is supplied to the laser LD5.

FIG. 10C shows a switching process by the multiplexer 1030 during the second to fourth scans in FIG. 8. Here, the preceding line is supplied to the laser LD2 and the succeeding line is supplied to the laser LD6.

Figure 9:
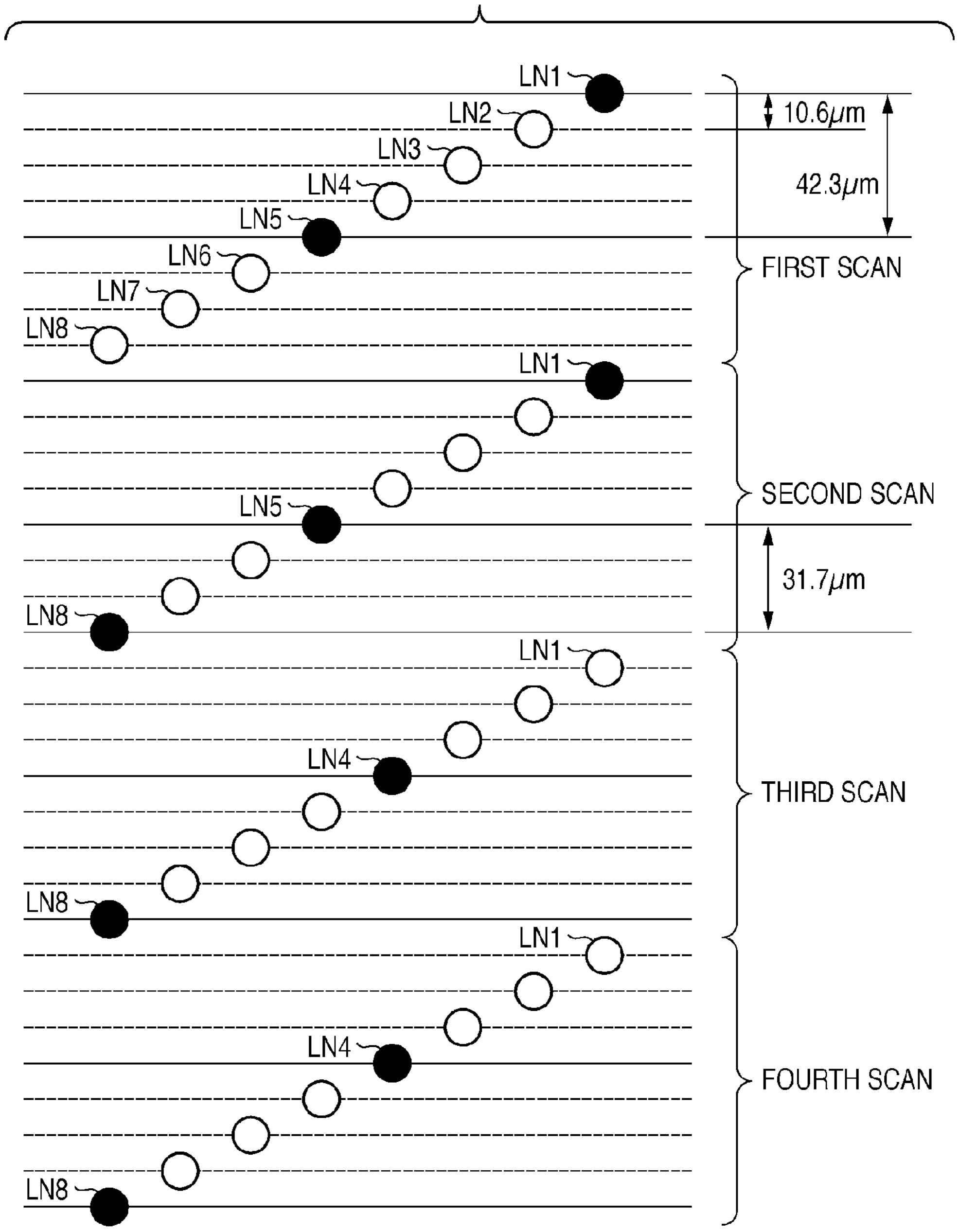
FIG. 9 is a diagram for describing operations in a case where contraction correction has been carried according to the first embodiment of the present invention.

Next, description is given in FIG. 9 of operations in a case where contraction correction has been carried out.

In FIG. 9, the lines LN1 to LN8 shown in the first scan indicate exposure lines to be scanned by the lasers LD1 to LD8 in the first time scan. Here also, the resolution of the laser diode 1017 is set to four times (2,400 dpi) the resolution of the image (600 dpi) in a same manner as described earlier. The solid lines and the dashed lines indicate the scanning lines of the laser diode 1017, with the solid lines indicating exposure lines for which lighting-driving is enabled. Here also, the spacing of the scanning lines corresponds to a resolution of 2,400 dpi, and therefore by exposing one line in four lines, this is matched to the main scanning direction resolution of 600 dpi. Accordingly, in the first time scan, lighting-driving of the lasers is enabled for the lines LN1 and LN5 indicated by the solid lines (which correspond to the lasers LD1 and LD5).

Next, during the second time line scan, the lines LN1 and LN5 are the same as during the first time scan, but the line LN8 is further added after a two line spacing (lines LN6 and LN7). Then, in the third time and fourth time scans, the lines LN4 and LN8 are set as the exposure lines for which laser lighting is enabled with a three line spacing, which is the same as previously.

With the image that has been scanned and exposed in this manner, the spacing between the exposure line LN5 and the exposure line LN8 in the second time scan is approximately 31.7 μm (which equals the spacing of 42.3 μm (600 dpi) minus 10.6 μm). In this way, a reduction proportional to a single scanning line, that is, 25%, is achieved. This corresponds to a second scanning cycle having a "reduced" line spacing of 3 lines. Here, the exposure lines before and after this are scanned with a pitch spacing of approximately 42.3 μm, which correspond to first scanning cycles (each having the "normal" line spacing of 3 lines) and therefore the sub-scanning direction scaling ratio for the image as a whole is determined by a frequency at which the second scanning cycle is provided amongst the first cycles.

In other words, when performing a reduction operation using a second scanning cycle once in every n scanning cycles (e.g. (n−1) first scanning cycles followed by one second scanning cycle), and when the first scanning cycles have 4 lines and the second scanning cycles have 3 lines, the reduction scaling ratio for the image as a whole is expressed as:

$$25 \div n\ (\%)$$

For example, by reducing the scanning-line spacing at a frequency of once in every 25 lines of image data and performing scanning and exposure with the "normal" sub-scanning pitch spacing for the remaining 24 image-data lines, it is possible to form an image that is reduced by 1%. The exposure lines (laser elements) to be driven are selected in response to the scaling ratio (scaling ratio setting) that is set in this manner.

Figure 11A:
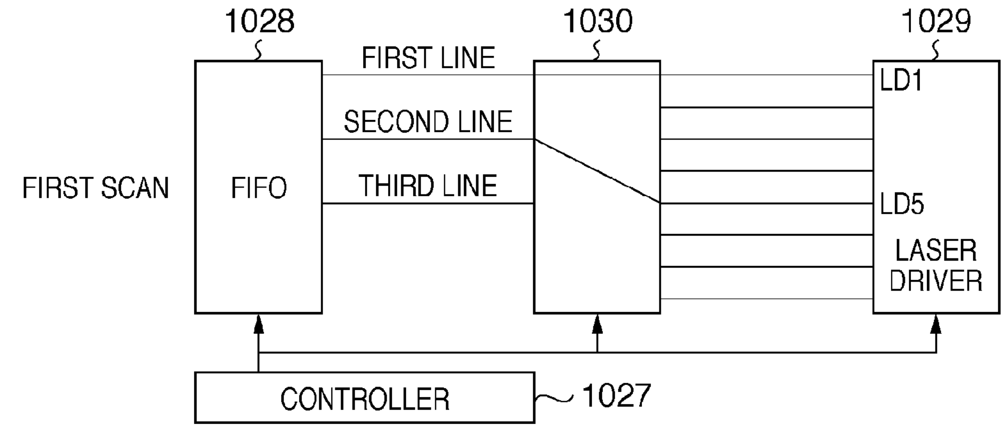
FIGS. 11A to 11C are diagrams for describing switching of laser driving for each scan shown in FIG. 9.
Figure 11B:
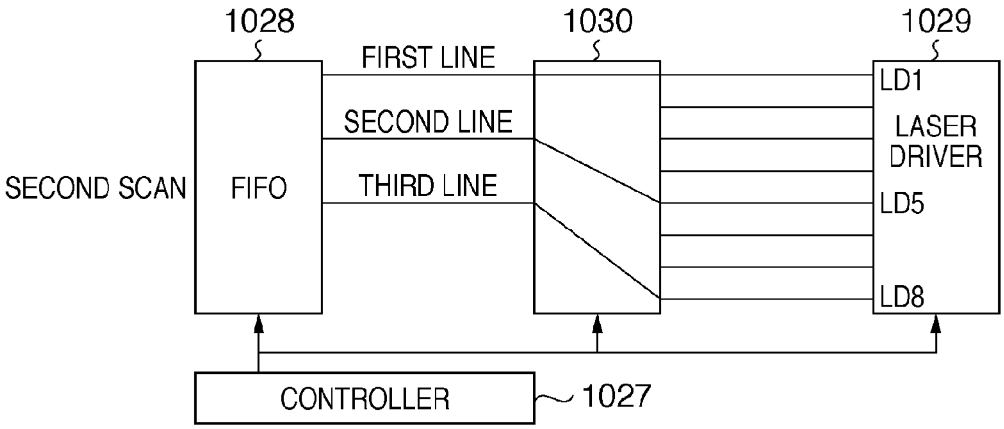
Figure 11C:
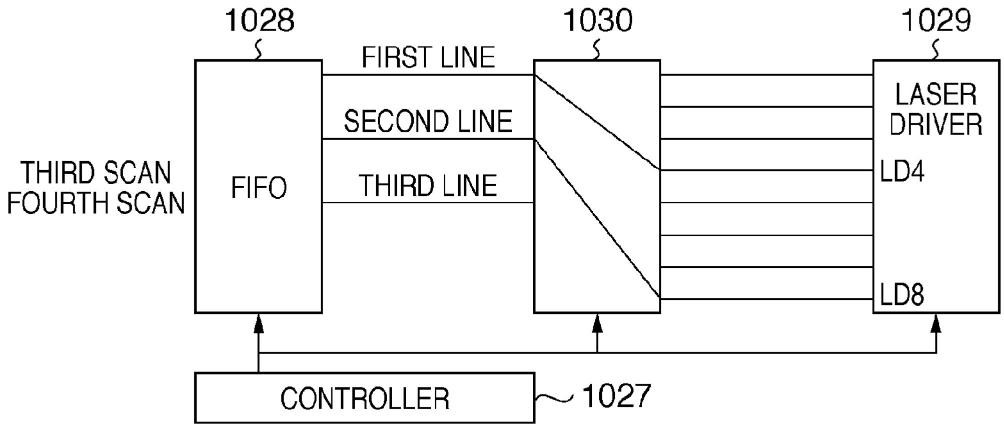

FIGS. 11A to 11C are diagrams for describing drive control of the lasers LD at this time.

In FIGS. 11A to 11C, three lines of data, which are a first line to a third line, are supplied from the FIFO 1028 to the multiplexer 1030. The multiplexer 1030 supplies the inputted line data to the laser drivers of the corresponding lasers LD1 to LD8 in accordance with a control signal from the controller 1027. In this way, only the lasers to which data has been inputted undergo lighting, and exposure of the exposure lines corresponding to that lasers are enabled.

FIG. 11A shows the case of the first time scan in FIG. 9. Here, the data of the first line is supplied to the laser LD1 and the data of the second line is supplied to the laser LD5. And control is performed such that the data of the third line is not supplied to the laser driver 1029.

FIG. 11B shows the case of the second time scan in FIG. 9. The data of the first line is supplied to the laser LD1, the data of the second line is supplied to the laser LD5, and the data of the third line is supplied to the laser LD8.

FIG. 11C shows the case of the third and fourth time scans in FIG. 9. In this case, the data of the first line is supplied to the laser LD4 and the data of the second line is supplied to the laser LD8. And control is performed such that the data of the third line is not supplied to the laser driver 1029.

By adjusting the sub-scanning direction resolution in this manner to form the image, contraction or expansion of the image in the sub-scanning direction that is produced cyclically in accordance with belt driving can be corrected.

Furthermore, contraction or expansion of the image in the sub-scanning direction that is produced due to expansion/contraction of the sheet can be corrected in a similar manner. Consider a case where, after the size of a sheet has contracted or expanded due to the heat and pressure applied to that sheet when fixing the image that has been formed on the front side of the sheet in double sided printing, an image is to be formed on the back side of that sheet. If the ratio of contraction or expansion in the size of the sheet is known at this time, adjustment can be performed so that the sizes of the images formed on the front and back sides of the sheet become equivalent by expanding or contracting the size of the image to be formed on the back side of the sheet according to the ratio in the manner as described earlier with reference to FIGS. 8 to 11.

Second Embodiment

Figure 12:
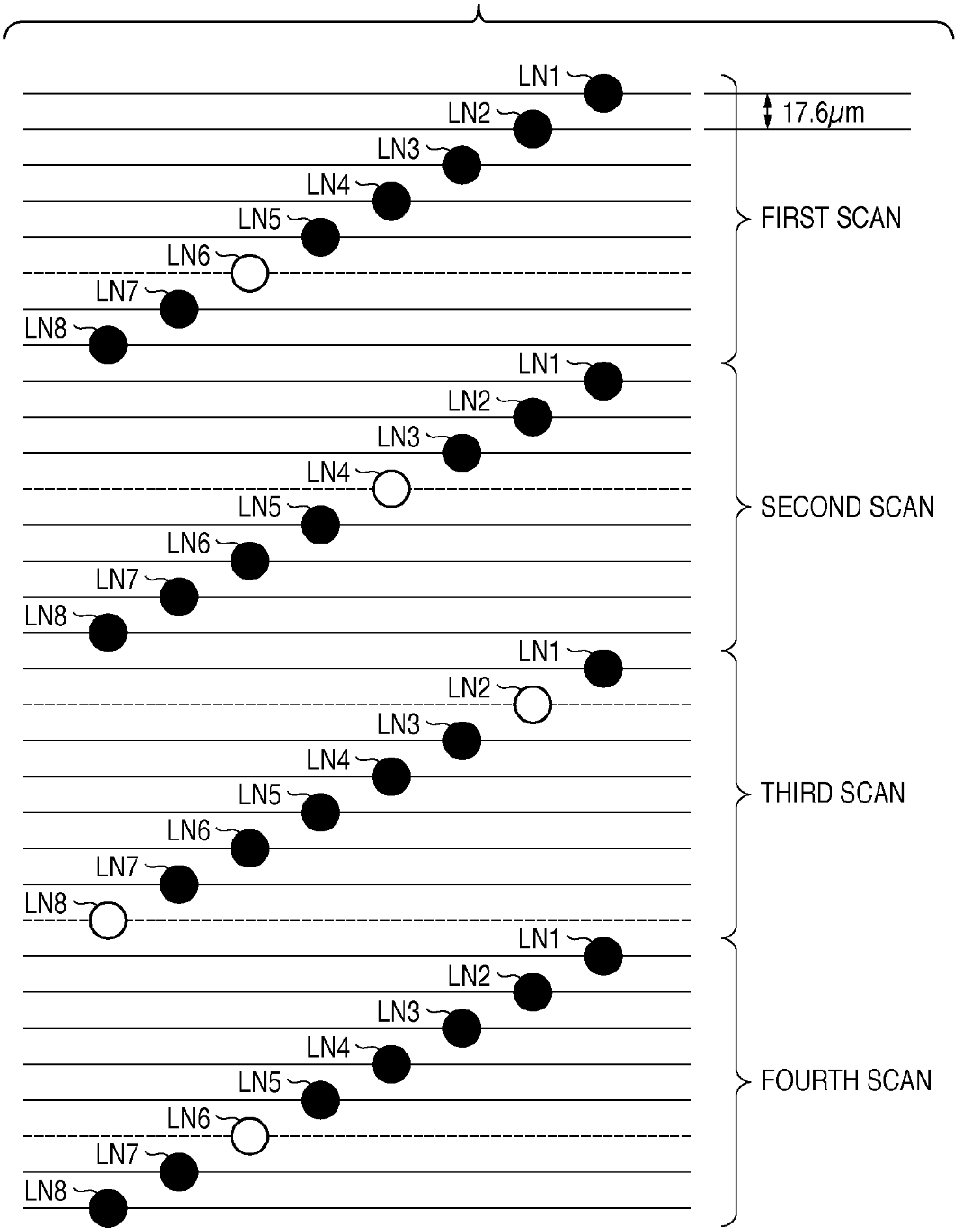
FIG. 12 is a diagram for describing image forming in the sub-scanning direction when using eight lasers LD1 to LD8 according to a second embodiment.

Next, description is given regarding an image forming operation according to a second embodiment of the present invention with reference to FIG. 12.

In FIG. 12, the lines LN1 to LN8 shown in the first time scan indicate exposure lines that are scannable by the lasers LD1 to LD8 in the first time scan. Here the sub-scanning direction resolution of the laser diode 1017 is set to 1.2 times the resolution of the image data. For example, in a case where the resolution (line pitch) of the image data is 1,200 dpi, the sub-scanning direction resolution of the laser diode 1017 becomes 1,440 dpi (a scanning line spacing—or predetermined pitch—of approximately 17.6 μm). In FIG. 12, the solid lines indicate exposure lines for which lighting-driving of the laser is enabled.

In the first time scan, the lines LN1 to LN5, LN7, and LN8 indicate exposure lines for which laser lighting is enabled. That is, by thinning out one line out of six scanning lines, the sub-scanning direction resolution of 1,440 dpi can be substantially matched to a horizontal direction resolution of 1,200 dpi.

In other words, by exposing five lines out of six scanning lines, the average pitch spacing is:

$$17.6 \times 6 \div 5 = 21.1$$

And this is substantially equivalent to approximately 21.2 μm, which is the exposure line spacing when the resolution is 1,200 dpi.

By similarly exposing five lines out of six scanning lines in the subsequent second time scan to fourth time scan, the image can be formed corresponding to approximately 21.2 μm in the sub-scanning direction also, which is the exposure line spacing when the resolution is 1,200 dpi.

Figure 13:
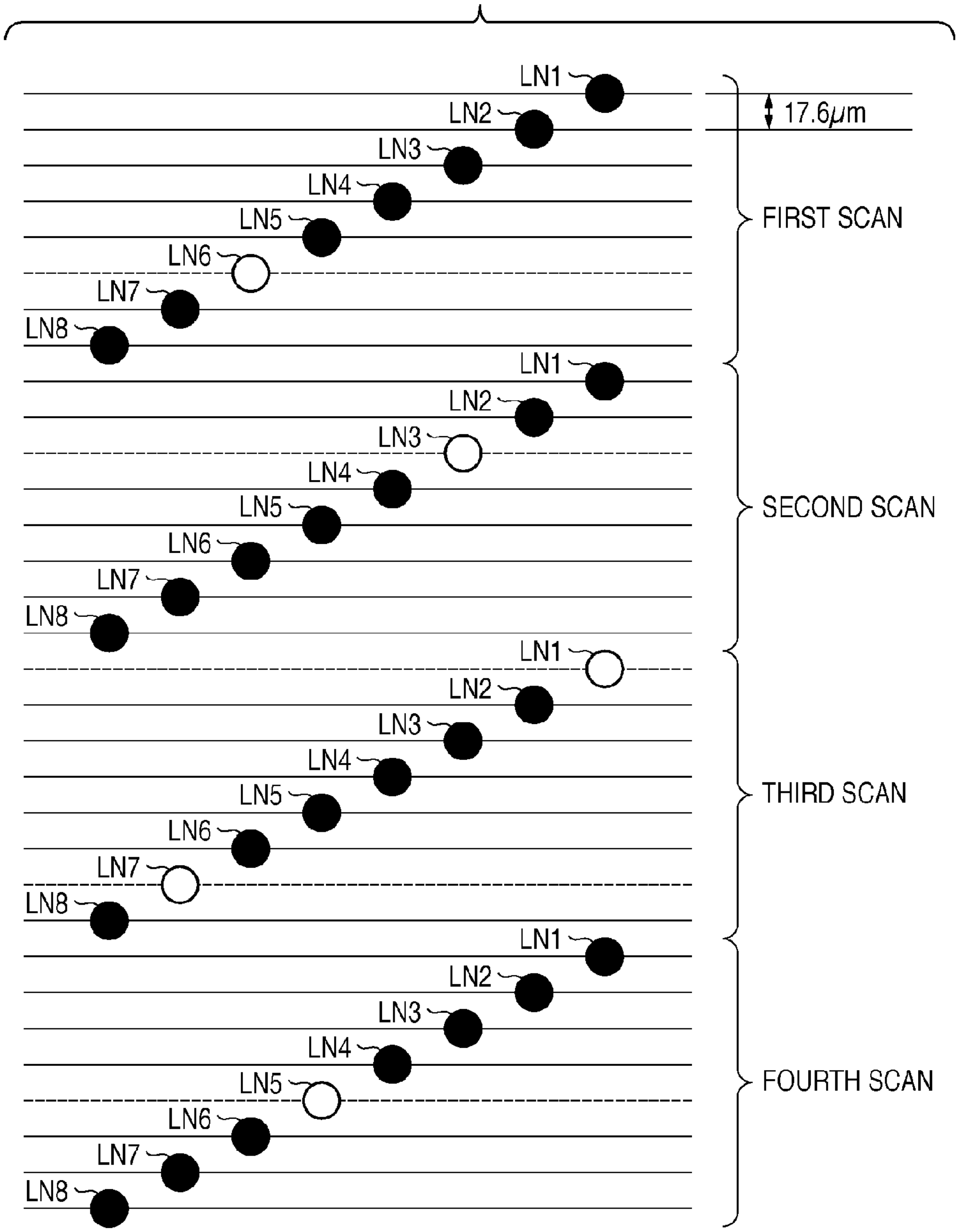
FIG. 13 is a diagram for describing an example of the second embodiment in which correction is performed so that the image is expanded in the sub-scanning direction with respect to FIG. 12.
Figure 14:
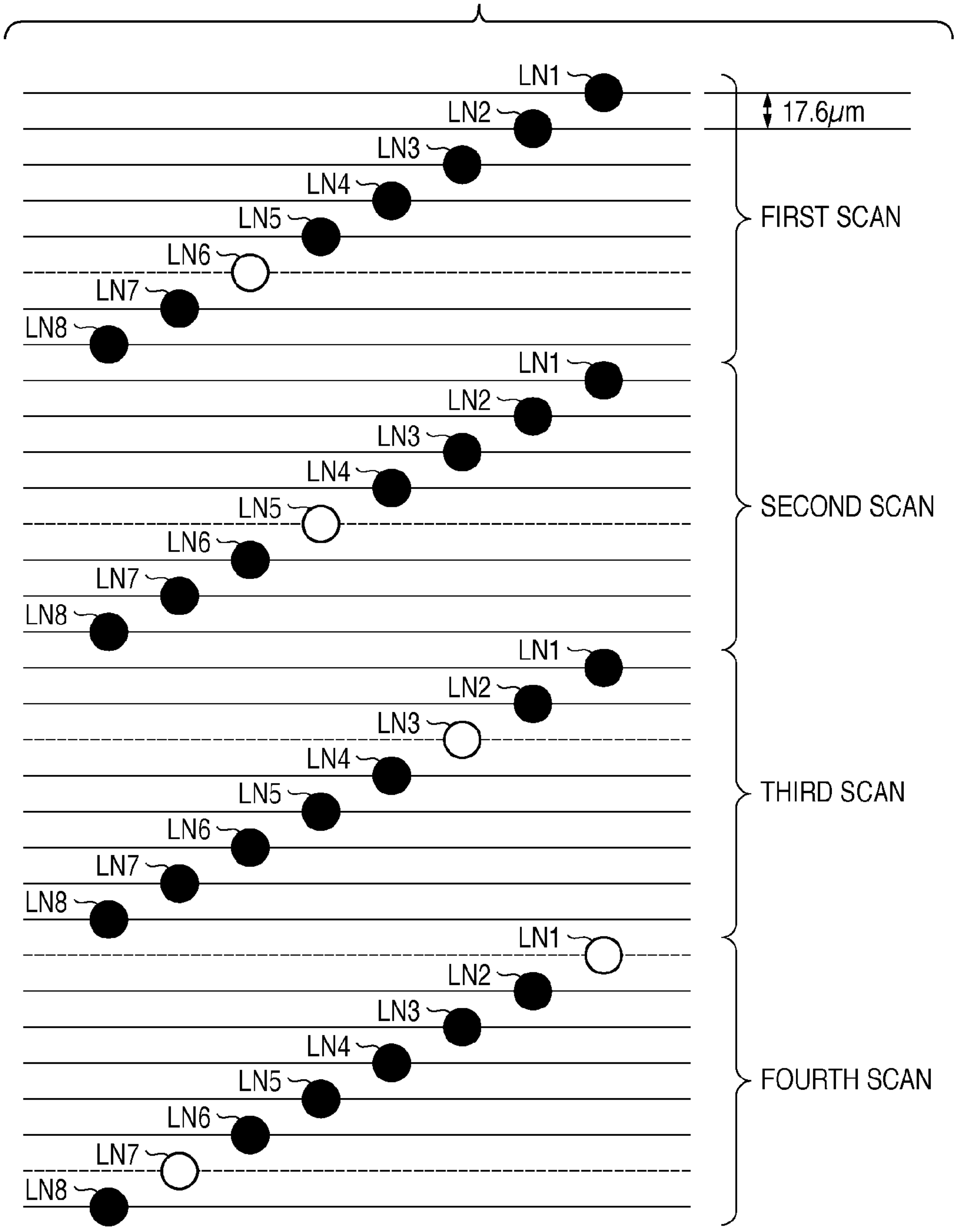
FIG. 14 is a diagram for describing an example of the second embodiment in which contraction correction has been carried out from the state shown in FIG. 12.

Next, using FIGS. 13 and 14, description is given regarding image expansion and contraction when this correction control has been carried out.

FIG. 13 is a diagram for describing an example in which correction is performed so that the image is expanded in the sub-scanning direction with respect to FIG. 12.

In FIG. 13, the lines LN1 to LN8 shown in the first time scan indicate exposure lines to be scanned by the lasers LD1 to LD8 in the first time scan by the laser diode 1017. In this case, the laser diode 1017 is set to a resolution of 1.2 times the resolution of the image data. In the first time scan, the exposure lines are selected in the same manner as in FIG. 12 to match the sub-scanning direction resolution and the horizontal direction resolution. The lines LN1 to LN6 correspond to a first scanning cycle in which 5 out of 6 lines are enabled. In this case, the first five lines of image data are applied respectively to the laser elements for LN1 to LN5.

Next, during the second time line scan, the lines LN1, LN2, and LN4 to LN8 are enabled. In this way, continuing from the scanning lines LN1 to LN6 of the preceding cycle, the lines of the next cycle are the lines LN7 of the first time scan and the lines LN1 to LN3 of the second time scan. The lines LN7 and LN8 of the first time scan and the lines LN1 and LN2 of the second time scan are the exposure lines for which exposure is enabled. Accordingly, in this scanning cycle, which is a second scanning cycle, four lines (LN7, LN8, LN1, and LN2) out of the next five scanning lines (LN7, LN8, and LN1 to LN3) are exposed. The sixth to ninth lines of image data are applied respectively to the laser elements for LN7, LN8, LN1 and LN2. Thus, the tenth line of image data that was applied to the laser element for line LN3 in the second time scan in FIG. 12 is now applied to the laser element for line LN4 in the second time scan in FIG. 13, which expands the image in the sub-scanning direction by a proportional amount. Also, in the second time scan, the lines LN4 to LN8 are the exposure lines for which exposure is enabled, constituting another scanning cycle in which five lines out of the six lines ending with the line LN1 of the third time scan are exposed. Similarly, a further cycle starts with the line LN2 of the third time scan and ends with the line LN7 of the third time scan. This cycle is another first scanning cycle in which five exposure lines out of six lines are enabled for exposure. During the second scanning cycle, four lines out of the five lines of the first time scan are exposed, and therefore the average exposure pitch spacing is:

$$17.6 \times 5 \div 4 = 22.0$$

And this means there is a 4.2% expansion in the sub-scanning direction compared to a first scanning cycle. Here, the exposure lines before and after this are formed with a pitch spacing of approximately 21.1 μm, corresponding to first scanning cycles, and therefore the scaling ratio of the image in the sub-scanning direction in this case is determined by a frequency at which second scanning cycles are provided among the first scanning cycles.

That is, when an expansion operation is carried out for spacing corresponding to one line one time in an m number of lines, the overall number of scanning lines becomes 6÷5×(m−4)+5 lines. In this expression, "6" indicates a process of 6 line unit, "5" indicates 5 lines to be used out of the 6 lines, "m" indicate an insertion of one line in every m lines of image data, "4" indicates 4 lines to be used out of the 5 lines, and "5 lines" indicates 5 line process for expansion.

Since the overall number of scanning lines in a case where this correction operation is not carried out is (6÷5×m) lines, the sub-scanning direction scaling ratio is expressed by the following expression:

$$((6-5\times(m-4)+5)-(6-5\times m))\div(6\div5\times m)\times 100[\%]=100\div6\div m[\%]$$

For example, in a case where it is desired to carry out 1% expansion, correction may be carried out by inserting an exposure line at a proportion of one time in 16.67 lines. Although it is necessary for the actual number of lines to be a natural number, the number of times of correction operations may be calculated using this proportion and, for example, by carrying out expansion correction of one exposure line 100 times in 1,667 scanning lines, an image can be obtained that is expanded 1% in the sub-scanning direction.

Next, FIG. 14 is a diagram for describing operations in a case where contraction correction has been carried out from the state shown in FIG. 12.

In FIG. 14, the first time scan is the same as in the case of FIG. 12.

Next, in the second time scan, the exposure lines for which exposure is enabled are the lines LN1 to LN4 and the lines LN6 to LN8. In this way, the lines LN7 and LN8 of the first time scan and the lines LN1 to LN4 of the second time scan are the exposure lines for which exposure is enabled. That is, six exposure lines out of the seven consecutive scanning lines ending with the line LN5 of the second time scan are enabled for exposure. In this way, the line of image data that was applied to the laser element for the line LN5 in the second time scan in FIG. 12 is applied to the laser element for the line LN4 in the second time scan in FIG. 14, which contracts the image in the sub-scanning direction by a proportional amount.

Thereafter, the five lines starting from the line LN6 of the second time scan and ending with the line LN2 of the third time scan are the exposure lines for which exposure is enabled, such that five exposure lines out of the six lines ending with the line LN3 of the third time scan are enabled for exposure. This, like the cycle from LN1 to LN6 of the first scan time, is a first cycle (5 out of 6 lines exposed). Next, the five lines starting from the line LN4 of the third time scan and ending with the line LN8 of the third scan are enabled in a same manner. Similarly, during the fourth time scan, five lines out of six lines are enabled for exposure. These are also first cycles.

In this way, during the cycle from LN7 of the first time scan to LN5 of the second time scan, which is a second cycle, six exposure lines out of seven scanning lines are enabled for exposure and therefore the average exposure pitch spacing is as follows.

$$17.6 \times 7 \div 6 = 20.5$$

And thus the pitch spacing becomes approximately 20.5 μm, thereby achieving a contraction of 4.2% compared to a first cycle. In this way, the sub-scanning direction scaling ratio of the image as a whole is determined by a frequency at which second cycles are provided among the first cycles.

That is, when a contraction operation is carried out for spacing corresponding to one line one time in an m number of lines, the overall number of scanning lines becomes {6÷5×(m−4)+5} lines.

Since the overall number of scanning lines in a case where this correction operation is not carried out is (6÷5×m) lines, the sub-scanning direction scaling ratio is as follows. Namely:

$$(6 \div 5 \times (m-6) + 7 - 6 \div 5 \times m) \div (6 \div 5 \times m) \times 100[\%] = -100 \div 6 \div m[\%]$$

In this expression, “7” indicates a process of 7 line unit, “6” indicates 6 lines to be used out of the 7 lines, “m” indicate a reduction of one line in every m lines of image data, and “5” indicates 5 lines to be used out of 6 lines.

In the above expressions, “6”, “5” and “m” have the same meaning as the described above.

For example, in a case where it is desired to carry out 1% contraction, correction may be carried out at a proportion of one time in 16.67 lines. Although it is necessary for the actual number of lines to be a natural number, the number of times of correction operations may be calculated using this proportion and, for example, by carrying out the correction operation 100 times in 1,667 scanning lines, image contraction of 1% in the sub-scanning direction can be achieved.

It should be noted that the switching for exposure lines as shown in FIG. 12 to FIG. 14 of the second embodiment is achieved by the controller 1027 and the multiplexer 1030 as shown in the above-described FIGS. 10A to 10C and FIGS. 11A to 11C. Note, however, that in the case of the second embodiment, the number of lines supplied to the multiplexer 1030 is seven lines.

With the above-described embodiments, by setting the resolution of the laser light source larger than the resolution of the image to be formed, and selecting the lasers for which driving is possible for each scanning line, the sub-scanning direction resolution of the image to be formed on the sheet can be adjusted to a desired value.

Figure 15:
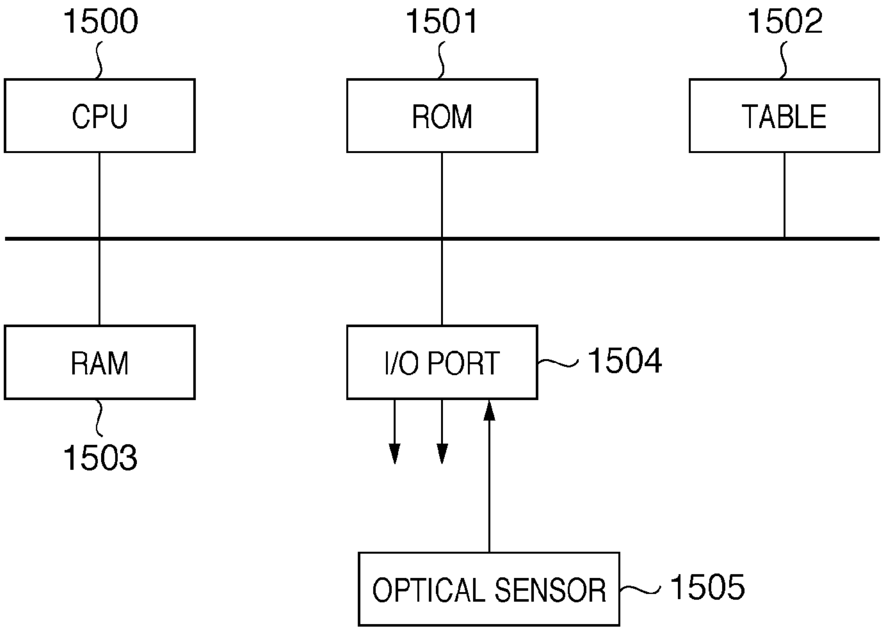
FIG. 15 is a block diagram showing a configuration of a controller of a color image forming apparatus according to the present embodiment.

FIG. 15 is a block diagram showing a hardware configuration of the controller 1027 according to the present embodiment.

The controller 1027 is provided with a CPU 1500 of a microprocessor or the like, a ROM 1501 in which programs to be executed by the CPU 1500 are stored, and a RAM 1503 that provides a work area when control processing is being performed by the CPU 1500. Furthermore, an I/O port 1504 outputs control signals to the above-described multiplexer 1030 and the laser driver 1029, and inputs BD signals and a signal detected by an optical sensor 1505 (described later) and the like. Also, a table 1502 is constituted by a nonvolatile memory such as an EEPROM for example, and stores information indicating which lines are to be selected by the multiplexer 1030 in which the number of times of scanning is associated with a contraction or expansion ratio as described earlier. Accordingly, the CPU 1500 directs the multiplexer 1030 as to which lines are to be selected for each scan in response to the number of times of scanning (n) and the contraction or expansion ratio, thereby performing control so that an image of a desired size is formed.

Figure 16:
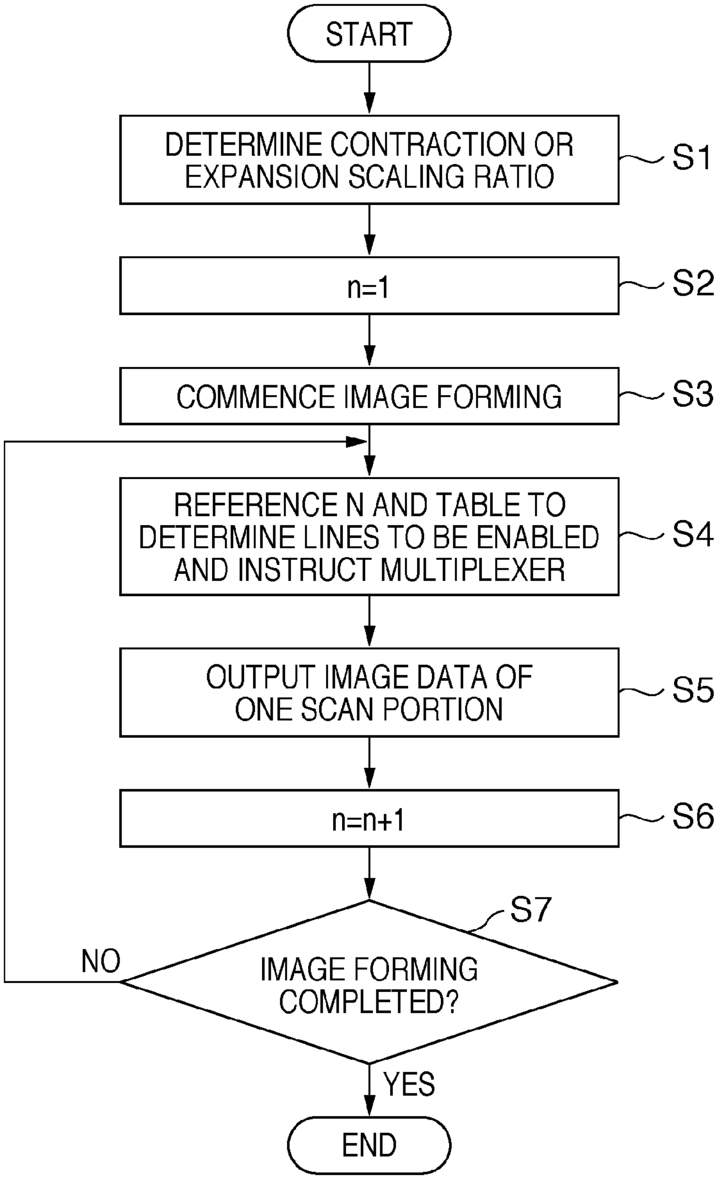
FIG. 16 is a flowchart for describing processing by the controller of the color image forming apparatus according to the present embodiment.

FIG. 16 is flowchart for describing processing by the controller 1027 according to the present embodiment, and a program for executing this processing is stored in the ROM 1501 and executed under the control of the CPU 1500. It should be noted that here description is given for a case of image forming with one color portion among those of a color image, but in the case of a color image forming apparatus as shown in FIG. 1 for example, this image forming is executed for each color of Y, M, C, and Bk.

First, in step S1, a contraction or expansion ratio of an image to be subsequently formed is obtained. The contraction ratio or expansion ratio of the image is determined in advance prior to image forming. Next, the procedure proceeds to step S2, and the variable n (provided in the RAM 1503) for counting the number of times of scanning is set to “1”. Next, the procedure proceeds to step S3, and image forming commences by commencing rotational driving of each type of motor and sheet feeding and the like. Next, the procedure proceeds to step S4, and the table 1502 is referenced based on a value of a variable n and the contraction ratio or expansion ratio of the image obtained at step S1, then the lines for which laser scanning is to be enabled next are determined and given to the multiplexer 1030. Then, in step S5, the image data of the lines to be formed in the next scan is output to the FIFO 1028. In this manner, the image data that is stored in the FIFO 1028 is read out from the FIFO 1028 synchronized with the BD signal and sent to the laser driver 1029 via the multiplexer 1030. In this way, laser light is irradiated by the scanner unit and images of a plurality of line portions are formed in parallel on the corresponding photosensitive drum. When an image of one main scanning is formed in this manner, the procedure proceeds to step S6 and 1 is added to the variable n that counts the number of times of scanning. Then, in step S7, an examination is performed as to whether the image forming for one page for example has been completed, and if it has not been completed, the procedure returns to step S4 and the aforementioned processing is repeated.

It should be noted that the ROM 1501 or the table 1502 may further store the data indicating fluctuation amounts in the sub-scanning direction size, which changes cyclically, for the images formed by the image forming mechanism of the image forming apparatus according to the present embodiment.

In this way, by switching the lines to be selected for image forming according to these fluctuation amounts in step S4, an image can be formed in which the fluctuation amount is corrected.

Furthermore, the optical sensor 1505 for example may be provided for detecting the fluctuation amounts in the sub-scanning direction size, which changes cyclically, in the images formed by the image forming mechanism of the image forming apparatus according to the present embodiment. And by referencing at the aforementioned step S4 the fluctuation amount detected by the optical sensor 1505 and switching the lines to be selected for image forming according to this fluctuation amount, an image can be formed in which the fluctuation amount is corrected.

By switching the lines for forming the image for each scan in this manner to form the image, an image having a desired scaling ratio can be formed on the sheet.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-178807, filed Jul. 6, 2007, and Japanese Patent Application No. 2008-165091, filed Jun. 24, 2008, which are hereby incorporated by reference herein in their entirety.

What is claimed is:

1. An image forming apparatus comprising:

an image forming unit having a plurality of scanning-line generating portions, each operable, in dependence upon image data applied thereto, to cause a light beam to scan across an image bearing member along a scanning line, the scanning lines of the plurality of scanning-line generating portions being parallel to one another and being spaced apart one from the next by a predetermined pitch that is smaller than a line pitch of the image data; and a line-pitch adjustment unit, connected for receiving the image data and pitch adjustment data for adjusting a pitch of the scanning lines, configured to be operable to control the application of the image data to the plurality of scanning-line generating portions such that the image data of two successive lines of the image data is applied to scanning-line generating portions whose respective scanning lines are spaced apart by a spacing different from the image-data line pitch, wherein said line-pitch adjustment unit is operable in a first scanning cycle to apply the image data of two successive lines to scanning-line generating portions whose respective scanning lines are spaced apart by a first predetermined number of scanning lines, and is operable in a second scanning cycle to apply the image data of two successive lines to scanning-line generating portions whose respective scanning lines are spaced apart by a second predetermined number of scanning lines, different from the first predetermined number, and wherein the first predetermined number is set according to a ratio of the predetermined pitch and the image-data line pitch.

2. An image forming apparatus for forming a toner image on a print medium, the image forming apparatus comprising:

a photosensitive drum configured to be driven to rotate;

an optical scanner unit, including a light source having a plurality of laser elements that respectively emits a laser light to expose the photosensitive drum and a polygonal mirror that polarizes the laser lights emitted by the plurality of laser elements to scan on the photosensitive drum, configured to arrange the plurality of laser elements so that the plurality of laser elements respectively expose different portions on the photosensitive drum in a rotational direction of the photosensitive drum;

a toner image forming unit configured to develop a latent image formed on the photosensitive drum by exposing of the laser lights with a toner and transfer a toner image developed by the toner on a print medium; and a controller programmed to provide:

a scaling ratio rate setting task that sets a scaling ratio indicating a size of the toner image in the rotational direction of the photosensitive drum; and a control task that controls the light source to, for a part of the plurality of laser elements, expose the photosensitive drum in one scanning of the photosensitive drum, and to switch a laser element for exposing the photosensitive drum a number of times based on the scaling ratio set by the scaling ratio setting task in the one scanning of the photosensitive drum, among a plurality of scannings to form the latent image of the toner image to be transferred on the print medium;

wherein, in a case where a toner image of a predetermined scaling ratio is formed on the print medium, the controller controls the light source to form the latent image on the photosensitive drum using laser elements whose laser light intervals on the photosensitive drum are a predetermined interval, and wherein, in a case where a toner image of a scaling ratio being different from the predetermined scaling ratio is formed on the print medium, the controller switches laser elements used for m-th and subsequent scannings on the photosensitive drum from laser elements used for (m−1)-th scanning on the photosensitive drum, and performs the switching of the laser elements a number of times based on the scaling ratio set by the scaling ratio setting task among the plurality of scannings for forming the latent image of the toner image to be transferred on the print medium.

3. The apparatus according to claim 2, wherein:

in a case where a toner image of a smaller ratio than the predetermined scaling ratio is formed on the print medium, the controller selects laser elements used for m-th and subsequent scannings on the photosensitive drum so that scanning lines of the m-th and subsequent scannings come closer to scanning lines of (m−1)-th scanning, and in a case where a toner image of a greater ratio than the predetermined scaling ratio is formed on the print medium, the controller selects laser elements used for m-th and subsequent scannings on the photosensitive drum so that the scanning lines of the m-th and subsequent scannings go away from the scanning lines of (m−1)-th scanning.

4. The apparatus according to claim 2, wherein the scaling ratio rate setting task sets a scaling ratio in correspondence with an expansion/contraction ratio of the print medium.

5. The apparatus according to claim 2, wherein:

the toner image forming unit comprises a fixing unit for heating and fixing the toner image transferred on the print medium, the toner image forming unit is operable to form a toner image on a second surface of the print medium that is a rear surface of a first surface to which the toner image has been fixed, and the scaling ratio rate setting task differs a scaling ratio of the toner image on the first surface from a scaling ratio of the toner image on the second surface.

6. The apparatus according to claim 5, wherein the scaling ratio rate setting task sets a smaller scaling ratio of the toner image on the second surface than the scaling ratio of the toner image on the first surface.

7. An image forming apparatus for forming a toner image on a print medium, the image forming apparatus comprising:

a photosensitive drum configured to be driven to rotate;

an optical scanner unit, including a light source having a plurality of laser elements that respectively emit a laser light to expose the photosensitive drum and a polygonal mirror that polarizes the laser lights emitted by the plurality of laser elements to scan on the photosensitive drum, configured to arrange the plurality of laser elements so that the plurality of laser elements respectively expose different portions on the photosensitive drum in a rotational direction of the photosensitive drum;

a toner image forming unit configured to develop a latent image formed on the photosensitive drum by exposing of the laser lights with a toner and transfer a toner image developed by the toner on a print medium;

a controller programmed to provide:

a scaling ratio rate setting task that sets a scaling ratio indicating a size of the toner image in the rotational direction of the photosensitive drum; and a control task that controls the light source to, for a group of the plurality of laser elements, expose the photosensitive drum in one scanning of the photosensitive drum, and to switch a group of laser elements for exposing the photosensitive drum a number of times based on the scaling ratio set by the scaling ratio setting task in the one scanning of the photosensitive drum, among a plurality of scannings to form the latent image of the toner image transferred on the print medium;

wherein, in a case where a toner image of a predetermined scaling ratio is formed on the print medium, the controller controls the light source to form the latent image on the photosensitive drum using a group of laser elements whose laser light intervals on the photosensitive drum are a predetermined interval, and wherein, in a case where a toner image of a scaling ratio being different from the predetermined scaling ratio is formed on the print medium, the controller switches a group of laser elements used for m-th and subsequent scannings on the photosensitive drum from a group of laser elements used for (m−1)-th scanning on the photosensitive drum, and performs the switching of the group of laser elements a number of times based on the scaling ratio set by the scaling ratio setting task among the plurality of scannings for forming the latent image of the toner image to be transferred on the print medium.

8. The apparatus according to claim 7, wherein:

in a case where a toner image of a smaller ratio than the predetermined scaling ratio is formed on the print medium, the controller selects a group of laser elements used for m-th and subsequent scannings on the photosensitive drum so that scanning lines of the m-th and subsequent scannings come closer to scanning lines of (m−1)-th scanning, and in a case where a toner image of a greater ratio than the predetermined scaling ratio is formed on the print medium, the controller selects a group of laser elements used for m-th and subsequent scannings on the photosensitive drum so that the scanning lines of the m-th and subsequent scannings go away from the scanning lines of (m−1)-th scanning.

9. The apparatus according to claim 7, wherein the scaling ratio rate setting task sets a scaling ratio in correspondence with an expansion/contraction ratio of the print medium.

10. The apparatus according to claim 9, wherein:

the toner image forming unit comprises a fixing unit that heats and fixes the toner image transferred on the print medium, the toner image forming unit is operable to form a toner image on a second surface of the print medium that is a rear surface of a first surface to which the toner image has been fixed, and the scaling ratio rate setting task differs a scaling ratio of the toner image on the first surface from a scaling ratio of the toner image on the second surface.

11. An apparatus according to claim 10, wherein the scaling ratio rate setting task sets a smaller scaling ratio of the toner image on the second surface than the scaling ratio of the toner image on the first surface.

* * * * *